US012780987B2

(12) United States Patent
Tanaka et al.

(10) Patent No.: US 12,780,987 B2
(45) Date of Patent: Nov. 3, 2026

(54) POLYPHENYLENE ETHER, PRODUCTION METHOD, THERMOSETTING COMPOSITION, PREPREG, AND LAMINATE THEREOF

(71) Applicant: ASAHI KASEI KABUSHIKI KAISHA, Tokyo (JP)

(72) Inventors: Yudai Tanaka, Tokyo (JP); Shinichi Fukuen, Tokyo (JP); Jaehoon Kim, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 240 days.

(21) Appl. No.: 18/262,576

(22) PCT Filed: Dec. 15, 2021

(86) PCT No.: PCT/JP2021/046372

§ 371 (c)(1),
(2) Date: Jul. 24, 2023

(87) PCT Pub. No.: WO2022/158180

PCT Pub. Date: Jul. 28, 2022

(65) Prior Publication Data

US 2024/0141106 A1 May 2, 2024

(30) Foreign Application Priority Data

Jan. 25, 2021 (JP) ................................ 2021-009705

(51) Int. Cl.

| | |
|---|---|
| ***C08G 65/44*** | (2006.01) |
| ***B32B 5/02*** | (2006.01) |
| ***B32B 5/26*** | (2006.01) |
| ***B32B 15/14*** | (2006.01) |
| ***B32B 15/20*** | (2006.01) |
| ***C08J 5/24*** | (2006.01) |

(52) U.S. Cl.

CPC .............. *C08G 65/44* (2013.01); *B32B 5/024* (2013.01); *B32B 5/263* (2021.05); *B32B 15/14* (2013.01); *B32B 15/20* (2013.01); *C08J 5/244* (2021.05); *B32B 2250/40* (2013.01); *B32B 2260/023* (2013.01); *B32B 2260/046* (2013.01); *B32B 2262/101* (2013.01); *C08J 2371/10* (2013.01)

(58) Field of Classification Search

CPC ...... C08G 65/44; C08G 65/48; C08G 65/485; B32B 5/263; B32B 5/024; B32B 15/08; B32B 15/14; B32B 15/20; B32B 2250/40; B32B 2260/023; B32B 2260/046; B32B 2262/101; C08J 5/244; C08J 5/24; C08J 2371/10; C08J 2371/12; C08L 71/12; C08L 71/126

See application file for complete search history.

(56) References Cited

U.S. PATENT DOCUMENTS

| | | | |
|---|---|---|---|
| 3,496,236 | A | 2/1970 | Cooper et al. |
| 4,309,513 | A | 1/1982 | Ueno et al. |
| 5,880,221 | A | 3/1999 | Liska et al. |
| 9,012,572 | B2 | 4/2015 | Lin et al. |
| 2005/0070685 | A1 | 3/2005 | Mitsui et al. |
| 2006/0041086 | A1 | 2/2006 | Birsak et al. |
| 2008/0171817 | A1 | 7/2008 | Peters et al. |
| 2018/0312683 | A1 | 11/2018 | Umehara et al. |
| 2021/0024695 | A1 | 1/2021 | Fukuoka et al. |
| 2021/0301129 | A1 | 9/2021 | Nosaka et al. |

FOREIGN PATENT DOCUMENTS

| | | | |
|---|---|---|---|
| JP | S56104935 | A | 8/1981 |
| JP | S56104961 | A | 8/1981 |
| JP | S5744625 | A | 3/1982 |
| JP | H03199256 | A | 8/1991 |
| JP | H04325558 | A | 11/1992 |
| JP | 2001040088 | A | 2/2001 |
| JP | 2002030145 | A | 1/2002 |
| JP | 2004099824 | A | 4/2004 |
| JP | 2004137491 | A | 5/2004 |
| JP | 2004339328 | A | 12/2004 |
| JP | 2006070136 | * | 3/2006 |
| JP | 2006335806 | A | 12/2006 |
| JP | 2008510059 | A | 4/2008 |

(Continued)

OTHER PUBLICATIONS

Jul. 20, 2023, International Preliminary Report on Patentability issued in the International Patent Application No. PCT/JP2021/046372.

Mar. 8, 2022, International Search Report issued in the International Patent Application No. PCT/JP2021/046372.

Jun. 6, 2024, the Supplementary European Search Report issued by the European Patent Office in the corresponding European Patent Application No. 21921282.6.

*Primary Examiner* — Camie S Thompson

(74) *Attorney, Agent, or Firm* — KENJA IP LAW PC

(57) ABSTRACT

To provide polyphenylene ether with excellent solubility in general-purpose ketone solvents and its production method, and to provide a thermosetting composition, prepreg, and laminate using the polyphenylene ether. The polyphenylene ether includes a total of 100 mol % of a repeating unit derived from a phenol of Formula (1) and a repeating unit derived from a phenol of Formula (2), wherein from 5 mol % to 85 mol % is the repeating unit derived from the phenol of Formula (1) and from 15 mol % to 95 mol % is the repeating unit derived from the phenol of Formula (2), and a reduced viscosity (ηsp/c) measured in chloroform solution at a concentration of 0.5 g/dL at 30° C. is from 0.03 dL/g to 0.30 dL/g.

21 Claims, No Drawings

(56) References Cited

FOREIGN PATENT DOCUMENTS

| | | | | |
|---|---|---|---|---|
| JP | 2008239720 | | * | 10/2008 |
| JP | 2012082343 | A | | 4/2012 |
| JP | 2014080553 | A | | 5/2014 |
| JP | 2015067675 | A | | 4/2015 |
| JP | 2017128718 | A | | 7/2017 |
| TW | 200304456 | A | | 10/2003 |
| TW | 202007709 | A | | 2/2020 |
| WO | 2019189829 | A1 | | 10/2019 |
| WO | 2020017570 | A1 | | 1/2020 |

* cited by examiner

POLYPHENYLENE ETHER, PRODUCTION METHOD, THERMOSETTING COMPOSITION, PREPREG, AND LAMINATE THEREOF

TECHNICAL FIELD

The present disclosure relates to polyphenylene ether, and a production method, thermosetting composition, prepreg, and laminate thereof.

BACKGROUND

Polyphenylene ether (hereinafter also referred to as "PPE") is widely used as a material for products and parts in the electrical and electronics field, automotive field, food and packaging field, and various other industrial material fields because of its excellent high-frequency properties, flame retardancy, and heat resistance. In particular, in recent years, low dielectric properties and heat resistance have led to application as a modifier in electronic materials such as substrate materials and various other applications.

However, although high molecular weight polyphenylene ether having repeating units derived from a monohydric phenol such as 2,6-dimethylphenol is generally soluble in highly toxic solvents such as chloroform, such polyphenylene ether is difficult to dissolve at room temperature at high concentrations in aromatic solvents such as toluene, which are known as good solvents, and is insoluble in ketone solvents such as methyl ethyl ketone. Accordingly, when used as a circuit board material, for example, handling resin varnish solutions of toluene, methyl ethyl ketone, and the like becomes difficult.

JP 2004-99824 A (PTL 1) describes that polyphenylene ether having a low molecular weight and a specific particle size has excellent solubility in solvents such as methyl ethyl ketone.

Further, JP 2004-339328 A (PTL 2) describes a modified polyphenylene ether compound having a defined polyphenylene ether moiety in the molecular structure and at least one p-ethenylbenzyl group, m-ethenylbenzyl group, or the like at a molecular end thereof.

Further, JP 2008-510059 A (PTL 3) describes a modified polymer that has a polyphenylene ether moiety in the molecular structure and a methacryl group at a molecular end thereof.

CITATION LIST

Patent Literature

PTL 1: JP 2004-99824 A
PTL 2: JP 2004-339328 A
PTL 3: JP 2008-510059 A

SUMMARY

Technical Problem

As mentioned above, PTL 1-3 describe methods for producing low molecular weight polyphenylene ether to improve solvent solubility of polyphenylene ether, but simply lowering the molecular weight of polyphenylene ether does not significantly improve solubility in general-purpose ketone solvents such as methyl ethyl ketone at room temperature, and solvent solubility is still insufficient. In particular, a method to improve long-term solvent solubility in a ketone solvent is desired.

In view of the above technical problem, it would be helpful to provide a polyphenylene ether with excellent solubility in general-purpose ketone solvents and a method of producing same. It would also be helpful to provide a thermosetting composition, prepreg, and laminate using the polyphenylene ether.

Solution to Problem

The present disclosure is as follows.

[1]

A polyphenylene ether composition comprising:

a total of 100 mol % of a repeating unit derived from a phenol of Formula (1) below and a repeating unit derived from a phenol of Formula (2) below, wherein from 5 mol % to 85 mol % is the repeating unit derived from the phenol of Formula (1) and from 15 mol % to 95 mol % is the repeating unit derived from the phenol of Formula (2), and a reduced viscosity (ηsp/c) measured in chloroform solution at a concentration of 0.5 g/dL at 30° C. is from 0.03 dL/g to 0.30 dL/g, (Formula 1)

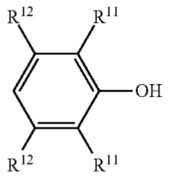

in Formula (1), $R^{11}$ are each independently a saturated hydrocarbon group having 1 to 6 carbons that may be substituted, an aryl group having 6 to 12 carbons that may be substituted, or a halogen atom, and $R^{12}$ are each independently a hydrogen atom, a carbon hydrocarbon group having 1 to 6 carbons that may be substituted, a carbon aryl group having 6 to 12 carbons that may be substituted, or a halogen atom, (Formula 2)

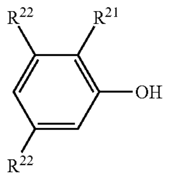

in Formula (2), $R^{22}$ are each independently a hydrogen atom, a saturated or unsaturated hydrocarbon group having 1 to 20 carbons that may be substituted, an aryl group having 6 to 12 carbons that may be substituted, or a halogen atom, where two $R^{22}$ are not both hydrogen atoms, and $R^{21}$ is a moiety structure represented by Formula (3) below, (Formula 3)

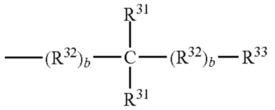

in Formula (3), $R^{31}$ are each independently a linear alkyl group having 1 to 8 carbons that may be substituted, or a cyclic alkyl structure having 1 to 8 carbons to which two $R^{31}$ are bonded, $R^{32}$ are each independently an alkylene group having 1 to 8 carbons that may be substituted, b are each independently 0 or 1, and $R^{33}$ is a hydrogen atom, an alkyl group having 1 to 8 carbons that may be substituted, or a phenyl group that may be substituted.

[2]

The polyphenylene ether of aspect [1], wherein the moiety structure represented by Formula (3) is a t-butyl group.

[3]

The polyphenylene ether of aspect [1] or [2], wherein an average number of hydroxyl groups is less than 2.5 per molecule.

[4]

The polyphenylene ether of any one of aspects [1] to [3], wherein an average number of hydroxyl groups is less than 0.2 per molecule.

[5]

The polyphenylene ether of any one of aspects [1] to [4], having at least one moiety structure selected from the group consisting of Formula (4), Formula (5), Formula (6), and Formula (7) below and having an average number of hydroxyl groups less than 0.2 per molecule, (Formula 4)

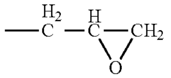

(Formula 5)

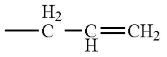

(Formula 6)

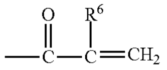

in Formula (6), $R^6$ is a hydrogen atom or a saturated or unsaturated hydrocarbon group having 1 to 10 carbons, where the saturated or unsaturated hydrocarbons may have substituents as long as the condition of 1 to 10 carbons is satisfied, (Formula 7)

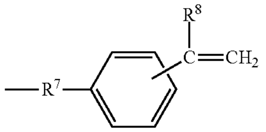

in Formula (7), $R^7$ is a saturated or unsaturated divalent hydrocarbon group having 1 to 10 carbons, and the saturated or unsaturated divalent hydrocarbons may have substituents as long as the condition of 1 to 10 carbons is satisfied, and $R^8$ is a hydrogen atom or a saturated or unsaturated hydrocarbon group having 1 to 10 carbons, and the saturated or unsaturated hydrocarbon may have substituents as long as the condition of 1 to 10 carbons is satisfied.

[6]

The polyphenylene ether of any one of aspects [1] to [5], comprising a repeating unit derived from a monohydric phenol having at least one unsaturated hydrocarbon group on a carbon atom ortho position to a carbon atom to which a hydroxyl group of phenol is bonded.

[7]

The polyphenylene ether of aspect [6], wherein the monohydric phenol is 2-allylphenol or 2-methyl-6-allylphenol.

[8]

A method of producing the polyphenylene ether of any one of aspects [1] to [7], comprising a process of oxidative polymerization of a phenol of Formula (1) and a phenol of Formula (2).

[9]

A polyphenylene ether solution comprising the polyphenylene ether of any one of aspects [1] to [7] and a ketone solvent.

[10]

A thermosetting composition comprising the polyphenylene ether of any one of aspects [1] to [7].

[11]

A prepreg comprising a base material and the thermosetting composition of aspect [10].

[12]

The prepreg of aspect [11], wherein the base material is glass cloth.

[13]

A laminate comprising a cured product of the prepreg of aspect [11] or [12] and a metal foil.

Advantageous Effect

The present disclosure provides polyphenylene ether with excellent solubility in general-purpose ketone solvents and a method of producing same. Further, a thermosetting composition, a prepregs, and a laminate using the polyphenylene ether are provided.

DETAILED DESCRIPTION

The following is a detailed description of embodiments of the present disclosure (hereinafter also referred to as "embodiments"). The following embodiments are illustrative examples of the present disclosure, which is not limited only to the embodiments, and the present disclosure may be implemented with appropriate modifications within the scope of the present disclosure.

A polyphenylene ether according to an embodiment in which some or all hydroxyl groups in the polyphenylene ether are modified may be simply described as "polyphenylene ether". Thus, when the term "polyphenylene ether" is used, both unmodified and modified polyphenylene ether are included in scope, unless a conflict arises.

In the present description, A (numerical value) to B (numerical value) means a range from A or more to B or less. In the present description, substitutions include, for example, saturated or unsaturated hydrocarbon groups that have 1 to 10 carbons, aryl groups that have 6 to 10 carbons, and halogen atoms.

<Polyphenylene Ether>

The polyphenylene ether according to the present embodiment comprises at least a repeating unit derived from a phenol of Formula (1) below and a repeating unit derived from a phenol of Formula (2) below, and may comprise only the repeating unit derived from a phenol of Formula (1) and the repeating unit derived from a phenol of Formula (2).

Formula (1)

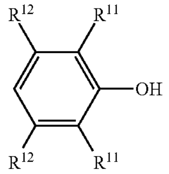

(In Formula (1), $R^{11}$ are each independently a saturated hydrocarbon group having 1 to 6 carbons that may be substituted, an aryl group having 6 to 12 carbons that may be substituted, or a halogen atom, and $R^{12}$ are each independently a hydrogen atom, a carbon hydrocarbon group having 1 to 6 carbons that may be substituted, a carbon aryl group having 6 to 12 carbons that may be substituted, or a halogen atom.)

Formula (2)

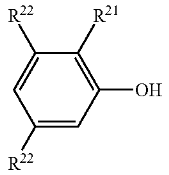

(In Formula (2), $R^{22}$ are each independently a hydrogen atom, a saturated or unsaturated hydrocarbon group having 1 to 20 carbons that may be substituted, an aryl group having 6 to 12 carbons that may be substituted, or a halogen atom, where two $R^{22}$ are not both hydrogen atoms, and $R^{21}$ is a moiety structure represented by Formula (3) below.)

Formula (3)

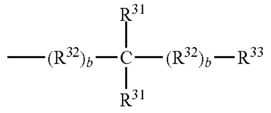

(In Formula (3), $R^{31}$ are each independently a linear alkyl group having 1 to 8 carbons that may be substituted, or a cyclic alkyl structure having 1 to 8 carbons to which two $R^{31}$ are bonded, $R^{32}$ are each independently an alkylene group having 1 to 8 carbons that may be substituted, b are each independently 0 or 1, and $R^{33}$ is a hydrogen atom, an alkyl group having 1 to 8 carbons that may be substituted, or a phenyl group that may be substituted.)

In Formula (1), $R^{11}$ are each independently preferably a saturated hydrocarbon group having 1 to 6 carbons or an aryl group having 6 to 12 carbons, more preferably a methyl group or a phenyl group, and even more preferably a methyl group. In Formula (1), the two $R^{11}$ preferably both have the same structure.

Substituents in the saturated hydrocarbon group having 1 to 6 carbons and the aryl group having 6 to 12 carbons of $R^{11}$ include a saturated or unsaturated hydrocarbon group having 1 to 10 carbons, an aryl group having 6 to 10 carbons, and a halogen atom.

In Formula (1), $R^{12}$ are each independently preferably a hydrogen atom or a hydrocarbon group having 1 to 6 carbons, and more preferably a hydrogen atom or a methyl group. In Formula (1), the two $R^{12}$ are preferably different, one a hydrogen atom and the other a hydrocarbon group (preferably a methyl group) having 1 to 6 carbons.

Substituents in the hydrocarbon group having 1 to 6 carbons and the aryl group having 6 to 12 carbons of $R^{12}$ include a saturated or unsaturated hydrocarbon group having 1 to 10 carbons, an aryl group having 6 to 10 carbons, and a halogen atom.

In Formula (2), $R^{22}$ are each independently preferably a hydrogen atom, a saturated or unsaturated hydrocarbon group having 1 to 15 carbons, or an aryl group having 6 to 12 carbons which may be substituted with an alkyl group having 1 to 6 carbons, more preferably a hydrogen atom, a hydrocarbon group having 1 to 6 carbons, or an aryl group having 6 to 10 carbons which may be substituted with an alkyl group having 1 to 6 carbons, and even more preferably a hydrogen atom or a methyl group. In Formula (2), the two $R^{22}$ are preferably different, and more preferably one is a hydrogen atom and the other is a hydrocarbon group (preferably a methyl group) having 1 to 6 carbons.

Substituents in the saturated or unsaturated hydrocarbon group having 1 to 20 carbons and the aryl group having 6 to 12 carbons of $R^{22}$ include a saturated or unsaturated hydrocarbon group having 1 to 10 carbons, an aryl group having 6 to 10 carbons, and a halogen atom.

The moiety structure represented by Formula (3) is preferably a group containing secondary and/or tertiary carbons, such as an isopropyl group, an isobutyl group, a sec-butyl group, a tert-butyl group, a tert-amyl group, a 2,2-dimethylpropyl group, a cyclohexyl group, and a structure having a phenyl groups at an end thereof, and more preferably a tert-butyl group or cyclohexyl group, and even more preferably a tert-butyl group.

Substituents in the linear alkyl group having 1 to 8 carbons in $R^{31}$, substituents in the alkylene group having 1 to 8 carbons in $R^{32}$, and substituents in the alkyl group and phenyl group having 1 to 8 carbons in $R^{33}$ include a saturated or unsaturated hydrocarbon group having 1 to 10 carbons, an aryl group having 6 to 10 carbons, and a halogen atom.

According to the present embodiment, structure of the polyphenylene ether may be identified by nuclear magnetic resonance (NMR), mass spectrometry, and the like. As a specific method to identify the structure of the polyphenylene ether, field desorption mass spectrometry (FD-MS), which is known to be less prone to fragmentation, may be performed, and the repeat unit may be estimated by an interval between detected ions. Further, the structure of the polyphenylene ether may be estimated by electron ionization (EI) in combination with peak analysis of fragment ions and structural analysis by NMR.

The polyphenylene ether according to the present embodiment comprises a total of 100 mol % of a repeating unit derived from a phenol of Formula (1) and a repeating unit derived from a phenol of Formula (2), where 5 mol % to 85 mol % is the repeating unit derived from the phenol of Formula (1) and 15 mol % to 95 mol % is the repeating unit derived from the phenol of Formula (2). From a viewpoint of obtaining polyphenylene ether with excellent solvent solubility and low dielectric loss tangent, the repeating unit derived from the phenol of Formula (2) is preferably at least 18 mol %, and more preferably at least 20 mol %. From the same viewpoint, the repeating unit derived from the phenol of Formula (1) is preferably 82 mol % or less, and more preferably 80 mol % or less.

The repeating unit derived from the phenol of Formula (1) in the polyphenylene ether may be of one or more species. The repeating unit derived from the phenol of Formula (2) in the polyphenylene ether may be of one or more species.

With respect to a total of 100 mol % of monomer units included in the polyphenylene ether (for example, all monomer units derived from phenol in the polyphenylene ether), a sum of the repeating units derived from the phenol of Formula (1) and the repeating units derived from the phenol of Formula (2) mole is preferably 75 mol % or more, more preferably 90 mol % or more, and even more preferably 95 mol % or more.

Respective proportions of repeating units derived from the phenol of Formula (1) and the phenol of Formula (2) may be determined using an analytical method such as $^{1}H$ NMR and $^{13}C$ NMR, for example, and more specifically by a method described in reference to an example below.

The phenol of Formula (1) does not have an unsubstituted ortho position (that is, no hydrogen atom is bonded to the two carbon atoms ortho to the carbon atom to which the hydroxyl group is bonded), and therefore can react with another phenolic monomer at only the carbon atom in the para position to the phenolic hydroxyl group. Thus, the repeating unit derived from Formula (1) includes a repeating unit having a structure of Formula (8) below.

Formula (8)

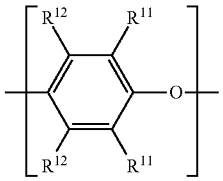

(In Formula (8), $R^{11}$ and $R^{12}$ are the same as in Formula (1).)

The phenol of Formula (2) may react with another phenolic monomer at either the ortho or para position of the phenol in addition to the phenolic hydroxyl group. Thus, the repeating unit derived from the phenol of Formula (2) has a monomer unit of Formula (9) below, Formula (10) below, or a combination thereof.

Formula (9)

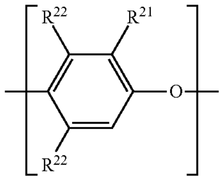

Formula (10)

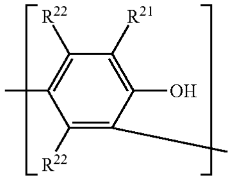

($R^{21}$ and $R^{22}$ in Formula (9) and Formula (10) are the same as in Formula (2).)

Reduced viscosity of the polyphenylene ether, measured in a chloroform solution at a concentration of 0.5 g/dL at 30° C., is preferably from 0.03 dL/g to 0.30 dL/g, and more preferably from 0.06 dL/g to 0.30 dL/g.

The reduced viscosity may be selected according to application. For example, a low reduced viscosity is desirable if one wants to improve flowability when dissolved in a solvent used to make a varnish in a process of applying the varnish to a substrate material.

Reduced viscosity may be measured by a method described in reference to an example below.

In addition to the phenol of Formula (1) and the phenol of Formula (2), the polyphenylene ether may comprise a tercopolymer including a structure derived from a dihydric phenol of Formula (11) below as an impurity (hereinafter also referred to simply as "impurity A"). The polyphenylene ether according to the present embodiment may be a mixture of the polyphenylene ether and the impurity A. A molar ratio of the impurity A to 100 mol % of the polyphenylene ether is preferably 10 mol % or less, and more preferably 5 mol % or less.

The impurity A may, for example, be synthesized as a tercopolymer including a structure derived from dihydric phenol, where z=0 in Formula (11), by reaction of the polyphenylene ether comprising the monohydric phenol of Formula (12) below, which is generated as a byproduct during oxidative polymerization of monohydric phenol.

Formula (11)

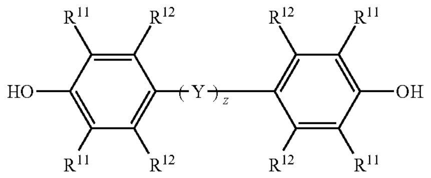

(In Formula (11), $R^{11}$ and $R^{12}$ are the same as in Formula (1).) z is 0 or 1, and Y is as follows:

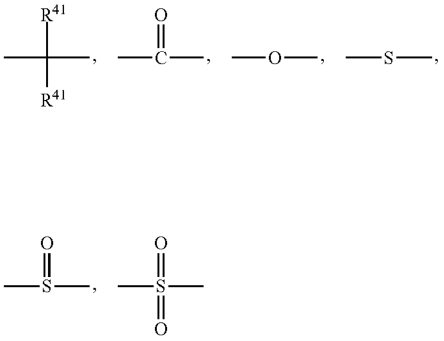

(In the formula, $R^{41}$ are each independently a hydrocarbon group having 1 to 6 carbons that may be substituted, an aryl group having 6 to 12 carbons that may be substituted, or a halogen atom.)

Formula (12)

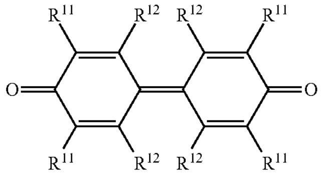

(In Formula (12), $R^{11}$ and $R^{12}$ are the same as in Formula (1).)

An average number of hydroxyl groups of the polyphenylene ether is, in the case of unmodified polyphenylene ether, preferably less than 2.5 per molecule, more preferably less than 2.2 per molecule, and even more preferably less than 2.0 per molecule. When the average number of hydroxyl groups exceeds 2.5 per molecule, this means that the product is a hyperbranched unmodified polyphenylene ether with no structural control.

The average number of hydroxyl groups may be measured by a method described in reference to an example below.

The polyphenylene ether according to the present embodiment may be a modified polyphenylene ether in which a hydroxyl group in the polyphenylene ether is modified to a functional group (for example, a functional group including an unsaturated carbon bond). In the case of a modified polyphenylene ether, the average number of hydroxyl groups is preferably less than 0.2 per molecule, more preferably less than 0.1 per molecule, and even more preferably less than 0.01 per molecule.

The polyphenylene ether according to the present embodiment may have at least one moiety structure selected from the group consisting of Formula (4), Formula (5), Formula (6), and Formula (7), below.

(Formula 4)

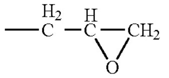

(Formula 5)

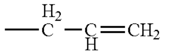

(Formula 6)

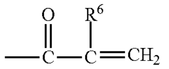

(In Formula (6), $R^6$ is a hydrogen atom or a saturated or unsaturated hydrocarbon group having 1 to 10 carbons, where the saturated or unsaturated hydrocarbons may have substituents as long as the condition of 1 to 10 carbons is satisfied.)

(Formula 7)

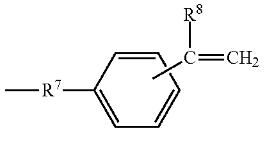

(In Formula (7), $R^7$ is a saturated or unsaturated divalent hydrocarbon group having 1 to 10 carbons, and the saturated or unsaturated divalent hydrocarbons may have substituents as long as the condition of 1 to 10 carbons is satisfied, and $R^8$ is a hydrogen atom or a saturated or unsaturated hydrocarbon group having 1 to 10 carbons, and the saturated or unsaturated hydrocarbon may have substituents as long as the condition of 1 to 10 carbons is satisfied.)

The moiety structure represented by at least one of the group consisting of Formula (4), Formula (5), Formula (6), and Formula (7) may be directly bonded to a hydroxyl group in the polyphenylene ether.

Respective proportions of repeating units derived from the phenol of Formula (1) and the phenol of Formula (2) in a modified polyphenylene ether in which the moiety structure represented by at least one of the group consisting of Formula (4), Formula (5), Formula (6), and Formula (7) may be determined using an analytical method such as $^1H$ NMR and $^{13}C$ NMR, for example, and more specifically by a method described in reference to an example below.

The polyphenylene ether according to the present embodiment may include a monohydric phenol having at least one unsaturated hydrocarbon group on a carbon atom ortho position to a carbon atom to which a hydroxyl group of the phenol is bonded. The monohydric phenol preferably has one unsaturated hydrocarbon group bonded to a carbon atom ortho position to a carbon atom to which the hydroxyl group of the phenol is bonded. The unsaturated hydrocarbon may be bonded to carbon atoms at both ortho positions to the carbon atom to which the hydroxyl group of the monohydric phenol is bonded, and may be bonded to one carbon atom at one ortho position. The monohydric phenol having at least one unsaturated hydrocarbon group on a carbon atom at an ortho position to the carbon atom to which the hydroxyl group of the phenol is bonded is a monohydric phenol different from the phenol of Formula (1) or Formula (2).

The unsaturated hydrocarbon group is preferably an unsaturated hydrocarbon group having 3 to 10 carbons, and more preferably an unsaturated hydrocarbon group having 3 to 5 carbons. Examples of such unsaturated hydrocarbon groups include alkenyl groups (for example, vinyl groups, allyl groups, and the like), alkynyl groups (for example, ethynyl groups, 1-propynyl, 2-propynyl, and the like), and the like.

The unsaturated hydrocarbons may have substituents as long as the condition of 3 to 10 carbons is satisfied.

A ratio of monohydric phenol having at least one unsaturated hydrocarbon group on a carbon atom ortho position to a carbon atom to which the hydroxyl group of phenol is bonded may be adjusted as needed to adjust a number of curable functional groups. However, with respect to a sum of the phenol of Formula (1) and monohydric phenol having at least one unsaturated hydrocarbon group on a carbon atom ortho position to a carbon atom to which the hydroxyl group of phenol is bonded, the ratio of monohydric phenol having at least one unsaturated hydrocarbon group on a carbon atom ortho position to a carbon atom to which the hydroxyl group of phenol is bonded is preferably 0.1 mol % to 30 mol %, and more preferably 0.1 mol % to 25 mol %.

In the polyphenylene ether according to the present embodiment, with respect to a sum of the repeating unit derived from phenol of Formula (1) and the repeating unit derived from monohydric phenol having at least one unsaturated hydrocarbon group on a carbon atom ortho position to a carbon atom to which a hydroxyl group of phenol is bonded, a molar ratio of the repeating unit derived from the monohydric phenol having at least one unsaturated hydrocarbon group on the carbon atom ortho position to the carbon atom to which the hydroxyl group of phenol is bonded is preferably from 0.1 mol % to 40 mol %, and more preferably from 0.1 mol % to 10 mol %.

<Method of Producing Polyphenylene Ether>

The polyphenylene ether according to the present embodiment is produced, for example, by a method that includes at least a process of oxidative polymerization of a monohydric phenol compound represented by Formula (1) and Formula (2). The process of oxidative polymerization is preferably performed by oxidative polymerization of a raw material including at least phenol of Formula (1) and phenol of Formula (2).

Monohydric phenol compounds represented by Formula (1) include, for example, 2,6-dimethylphenol, 2-methyl-6-ethylphenol, 2,6 diethylphenol, 2-ethyl-6-n-propylphenol, 2-methyl-6-chlorophenol, 2-methyl-6-bromophenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2-methyl-6-tolylphenol, 2,6-ditolylphenol, 2,3,6-trimethylphenol, 2,3-diethyl-6-n-propylphenol, 2,3,6-tributylphenol, 2,6-di-n-butyl-3-methylphenol, 2,6-dimethyl-3-n-butylphenol, 2,6-dimethyl-3-t-butylphenol, and the like. Of these, 2,6-dimethylphenol, 2,3,6-trimethylphenol, and 2,6-diphenylphenol are preferred due to being inexpensive and readily available.

Among monohydric phenol compounds represented by Formula (1), one species may be used alone and multiple species may be used in combination.

Monohydric phenol compounds represented by Formula (2) include, for example, 2-isopropyl-5-methylphenol, 2-cyclohexyl-5-methylphenol, 2-tert-butyl-5-methylphenol, 2-isobutyl-5-methylphenol, and the like. Bulky substituents 2-t-butyl-5-methylphenol and 2-cyclohexyl-5-methylphenol are preferred from a viewpoint of suppressing hyperbranching and gelation.

Among monohydric phenol compounds represented by Formula (2), one species may be used alone and multiple species may be used in combination.

The process of oxidative polymerization may, for example, be a process of oxidative polymerization of a raw material including, in addition to a phenol of Formula (1) and a phenol of Formula (2), a monohydric phenol having at least one unsaturated hydrocarbon group on a carbon atom at an ortho position to a carbon atom to which a hydroxyl group of a phenol is bonded.

As a monohydric phenol having at least one unsaturated hydrocarbon group on a carbon atom ortho position to a carbon atom to which a hydroxyl group of a phenol is bonded, a monohydric phenol having at least one (preferably one) unsaturated hydrocarbon group bonded to the ortho carbon atom and hydrogen atoms bonded to meta and para position carbon atoms is preferred. The monohydric phenol is more preferably 2-allylphenol, 2-allyl-6-methylphenol, and is even more preferably 2-allylphenol.

Among the monohydric phenols described above, which have at least one unsaturated hydrocarbon group on the carbon atom ortho position to the carbon atom to which the hydroxyl group of the phenol is bonded, one species may be used alone and multiple species may be used in combination.

Typically, oxidative polymerization of phenol having a hydrogen atom at an ortho position (for example, 2-methylphenol, 2,5-dimethylphenol, 2-phenylphenol) makes controlling a bonding position of phenolic compounds during oxidative polymerization difficult, because an ether bond may form at the ortho position, and a high molecular weight branched polymer having an average number of hydroxyl groups of 3 or more per molecule is obtained, eventually generating a solvent-insoluble gel component (see oxidative polymerization of 2,5-dimethylphenol and 2,6-dimethylphenol in Comparative Example 1 below).

On the other hand, when phenol represented by Formula (2) having a bulky substituent at one ortho position side is used, despite having a hydrogen atom at the opposite ortho position, controlling a bonding position of the phenol compound during oxidative polymerization becomes possible, and polyphenylene ether having an average number of hydroxyl groups less than 2.5 per molecule becomes possible.

Further, when phenol represented by Formula (2) having a bulky substituent at one ortho position side is used, even when a monohydric phenol having a non-bulky substituent (for example, a hydrogen atom, an allyl group, a methyl group, an ethyl group, a methoxy group, or the like) at the ortho position of the phenol oxygen atom is used as a third component, polyphenylene ether having an average number of hydroxyl groups less than 2.5 per molecule may be obtained without gelation.

Molecular weight of the polyphenylene ether according to the present embodiment may be adjusted by the molar ratio of the repeating unit derived from Formula (2) to the sum of the repeating unit derived from Formula (1) and the repeating unit derived from Formula (2). In other words, a molecular weight (reduced viscosity) to be reached may be lowered when the molar ratio of the repeating unit derived from Formula (2) is high, and the molecular weight (reduced viscosity) may be adjusted higher when the molar ratio of the repeating unit derived from Formula (2) is low. The reason for this is not clear, but the bulky substitution at the ortho-position in Formula (2) is assumed to be suppressing an increase in molecular weight.

(Oxidative Polymerization Process)

Here, according to a method of producing polyphenylene ether, an aromatic solvent, which is a good solvent for polyphenylene ether, may be used as a polymerization solvent in the oxidative polymerization process.

A good solvent for polyphenylene ether is a solvent able to dissolve polyphenylene ether. Examples of such solvents include aromatic hydrocarbons such as benzene, toluene, xylene (including o-, m-, and p-isomers), and ethylbenzene, and halogenated hydrocarbons such as chlorobenzene and dichlorobenzene; nitro compounds such as nitrobenzene; and the like.

As a polymerization catalyst used according to the present embodiment, any known catalyst system generally usable for production of polyphenylene ether may be used. Generally known catalyst systems are those comprising transition metal ions having redox potential and amine compounds capable of complexing with the transition metal ions. For example, a catalyst system comprising copper compound and an amine compound, a catalyst system comprising a manganese compound and an amine compound, a catalyst system comprising a cobalt compound and an amine compound, and the like. Polymerization reaction proceeds efficiently under slightly alkaline conditions, and therefore some alkali or additional amine compound may be added.

A polymerization catalyst suitably for use according to the present embodiment is a catalyst comprising a copper compound, a halogen compound, and an amine compound as catalyst components, and more preferably, a catalyst comprising a diamine compound represented by Formula (13) below as an amine compound.

Formula (13)

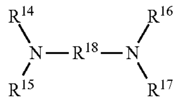

In Formula (13), $R^{14}$, $R^{15}$, $R^{16}$, and $R^{17}$ are each independently a hydrogen atom or a linear or branched alkyl group having 1 to 6 carbons, where not all are hydrogen atoms at the same time. $R^{18}$ is a linear or methyl branching alkylene group having 2 to 5 carbons.

Examples of a copper compound of the catalytic components mentioned are listed here. A suitable copper compound may be a cuprous compound, a cupric compound, or a mixture thereof. Examples of cupric compounds include cupric chloride, cupric bromide, cupric sulfate, cupric nitrate, and the like. Examples of cuprous compounds include cuprous chloride, cuprous bromide, cuprous sulfate, cuprous nitrate, and the like. Among these, particularly preferred metal compounds are cuprous chloride, cupric chloride, cuprous bromide, and cupric bromide. These copper salts may be synthesized at a time of use from oxides (for example, cuprous oxide), carbonates, hydroxides, or the like, and corresponding halogens or acids. A method often used is to prepare a mixture of cuprous oxide and hydrogen halide (or a solution of hydrogen halide) as illustrated previously.

Halogen compounds include, for example, hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, tetraethylammonium iodide, and the like. These may be used as aqueous solutions or solutions with appropriate solvents. These halogen compounds may be used as components alone or in combination of two or more. A preferred halogenated compound is an aqueous solution of hydrogen chloride and hydrogen bromide.

An amount of such a compound used is not particularly limited, but between 2 and 20 times a molar amount of copper atoms as halogen atoms is preferable, and a preferred amount of copper atoms used per 100 moles of phenol compound added to the polymerization reaction ranges from 0.02 moles to 0.6 moles.

The following is a list of examples of diamine compounds as a catalytic component. For example, N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylenediamine, N-n-propylethylenediamine, N,N'-n-propylethylenediamine, N-i-propylethylenediamine, N,N'-i-propylethylenediamine, N-n-butylethylenediamine, N,N'-n-butylethylenediamine, N-i-butylethylenediamine, N,N'-i-butylethylenediamine, N-t-butylethylenediamine, N,N'-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, N,N,N',N'-tetramethyl-1,5-diaminopentane, and the like. A preferred diamine compound according to the present embodiment is one in which a number of carbons in an alkylene group connecting two nitrogen atoms is 2 or 3. An amount of such diamine compound used is not particularly limited, but is preferably in a range from 0.01 moles to 10 moles per 100 moles of phenol compound added to the polymerization reaction.

According to the present embodiment, a primary amine and a secondary monoamine may be included as a component of the polymerization catalyst. Secondary monoamines include, but are not limited to, dimethylamine, diethylamine, di-n-propylamine, di-i-propylamine, di-n-butylamine, di-i-butylamine, di-t-butylamine, dipentylamine, dihexylamine, dioctylamine, didecylamine, dibenzylamine, methylethylamine, methylpropylamine, methylbutylamine, cyclohexylamine, N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, diphenylamine, and the like.

According to the present embodiment, a tertiary monoamine compound may be included as a component of the polymerization catalyst. A tertiary monoamine compound is an aliphatic tertiary amine, including alicyclic tertiary amines. For example, trimethylamine, triethylamine, tripropylamine, tributylamine, triisobutylamine, dimethylethylamine, dimethylpropylamine, allyldiethylamine, dimethyl-n-butylamine, diethylisopropylamine, n-methylcyclohexylamine, and the like. These tertiary monoamines may be used alone or in combination of two or more. An amount of these used is not particularly limited, but is preferably in a range from 15 moles or less per 100 moles of phenol compound added to the polymerization reaction.

According to the present embodiment, there is no restriction on addition of a surfactant that is known to have an enhancing effect on polymerization activity. Such a surfactant includes, for example, trioctylmethylammonium chloride, known under the trade names Aliquat 336 and Capriquat. An amount used preferably does not exceed 0.1 mass % with respect to a total polymerization reaction mixture of 100 mass %.

As an oxygen-containing gas in polymerization according to the present embodiment, pure oxygen, a mixture of oxygen and an inert gas such as nitrogen in any ratio, air, or even a mixture of air and an inert gas such as nitrogen in any ratio may be used. Pressure in the system during the polymerization reaction is sufficient at ambient pressure, but may be reduced or increased as required.

Temperature of polymerization is not particularly limited, but is in a range from 0° C. to 60° C., and preferably from 10° C. to 40° C., because if the temperature is too low, it is difficult for the reaction to proceed, and if too high, reaction selectivity may decrease and a gel may be formed.

In the production of the polyphenylene ether, polymerization may be carried out in a poor solvent such as an alcohol.

(Copper Extraction and Byproduct Removal Process)

According to the present embodiment, there is no restriction on post-treatment method after the polymerization reaction is completed. Typically, an acid such as hydrochloric acid and acetic acid, ethylenediaminetetraacetic acid (EDTA), a salt thereof, nitrilotriacetic acid, a salt thereof, and the like is added to the reaction solution to deactivate the catalyst. Removal and treatment of a dihydric phenolic byproduct produced by the polymerization of the polyphenylene ether may also be performed using a known method. When catalytic metal ions are substantially deactivated as described above, the mixture is decolorized simply by heating. Further, adding a required amount of a known reducing agent is also possible. Known reducing agents include hydroquinone and sodium dithionite.

(Liquid-Liquid Separation Process)

In the production of the polyphenylene ether, water is added to extract the compound with the inactivated copper catalyst, and after liquid-liquid separation into organic and aqueous phases, the copper catalyst may be removed from the organic phase by removing the aqueous phase. The liquid-liquid separation process is not limited to any particular method, and includes static separation, centrifugation, and the like. To promote the liquid-liquid separation, a known surfactant and the like may be used.

(Concentration and Drying Process)

Next, in the production of the polyphenylene ether, the organic phase containing the polyphenylene ether after the liquid-liquid separation may be concentrated and dried by volatilizing the solvent.

A method of volatilizing the solvent in the organic phase is not particularly limited, and may include a method such as transferring the organic phase to a high-temperature concentration tank and concentration by removing the solvent, removing toluene using equipment such as a rotary evaporator, and the like.

As a temperature of a drying process, at least 60° C. is preferred, 80° C. or higher is more preferred, 120° C. or higher is even more preferred, and 140° C. or higher is most preferred. Drying of the polyphenylene ether at temperatures equal to or more than 60° C. efficiently reduces an amount of high boiling point volatile components in polyphenylene ether powder.

To obtain the polyphenylene ether at high efficiency, a method such as increasing the drying temperature, increasing the vacuum in the drying atmosphere, and stirring during drying is effective, but the method of increasing the drying temperature is particularly preferred from a view point of production efficiency. In the drying process, using a dryer with a mixing function is preferable. Mixing functions include agitating and rolling dryers. This allows for higher throughput and maintains high productivity.

The polyphenylene ether according to the present embodiment may be produced by a redistribution reaction in which a polyphenylene ether derived from a phenol of Formula (1) is equilibrated with a phenol compound of Formula (2) in the presence of an oxidizing agent. Redistribution reactions are well known in the art and are described, for example, in U.S. Pat. No. 3,496,236 B by Cooper et al. and U.S. Pat. No. 5,880,221 B by Liska et al.

(Modification Reaction Process)

There is no limitation on a method of introducing a functional group into a hydroxyl group of unmodified polyphenylene ether. For example, a method may include a reaction of forming an ester bond between the hydroxyl group of unmodified polyphenylene ether and a carboxylic acid having a carbon-carbon double bond (hereinafter, "carboxylic acid"). Various known methods of ester bond formation may be used. Examples include: a. reaction of a carboxylic acid halide with a hydroxyl group at a polymer end; b. formation of an ester bond by reaction with a carboxylic anhydride; c. direct reaction with a carboxylic acid; d. transesterification; and the like. Among these, a. reaction with a carboxylic acid halide is one of the most common methods. Chlorides and bromides are typically used as carboxylic acid halides, but other halogens may be utilized. A reaction may be either a direct reaction with a hydroxyl group or a reaction with an alkali metal salt of a hydroxyl group. Direct reaction of a carboxylic acid halide with a hydroxyl group generates an acid such as a hydrogen halide, and therefore a weak base such as an amine may be added to trap the acid. In b. reaction with carboxylic anhydride and c. direct reaction with carboxylic acid, a compound such as a carbodiimide or dimethylaminopyridine, for example, may be added to activate a reaction site and promote the reaction. In the case of d. transesterification, an alcohol produced is preferably removed as required. Further, a known metal catalyst may be added to accelerate the reaction. After the reaction, the polymer solution may be washed with an aqueous, acidic, or alkaline solution to remove byproducts such as amine salts, and the polymer solution may be dropped into a poor solvent such as an alcohol and the target product recovered by reprecipitation. Further, after washing the polymer solution, the solvent may be removed under reduced pressure to recover the polymer.

According to the present embodiment, the method of producing the modified polyphenylene ether is not limited to the method of producing the multifunctional modified polyphenylene ether described above, and the order and number of times of the oxidation polymerization process, the copper extraction and byproduct removal process, the liquid-liquid separation process, and the concentration and drying process as described above may be appropriately modified.

(Polyphenylene Ether Solution)

According to the present embodiment, the polyphenylene ether solution comprises at least the polyphenylene ether according to the present embodiment and a ketone solvent, and may also contain other components. The solvent may include a solvent other than a ketone solvent.

The ketone solvent may be acetone, methyl ethyl ketone, methyl propyl ketone, methyl isobutyl ketone, diisobutyl ketone, cyclohexanone, and the like.

With respect to a total mass of the polyphenylene ether solution of 100 mass %, a ratio of the polyphenylene ether and the ketone solvent to the total mass is preferably 80 mass % or more, more preferably 90 mass % or more, even more preferably 95 mass % or more, and especially preferably 100 mass %.

A mass ratio of the polyphenylene ether with respect to a polyphenylene ether solution of 100 mass % is preferably from 1 mass % to 40 mass %. A mass ratio of the ketone solvent with respect to the polyphenylene ether solution of 100 mass % is preferably from 60 mass % to 99 mass %.

The polyphenylene ether solution may be produced, for example, by mixing the polyphenylene ether, the ketone solvent, and any other components or other solvents.

<Thermosetting Composition>

The polyphenylene ether according to the present embodiment may be used as a raw material for a thermosetting composition. The thermosetting composition is not limited as long as it comprises the polyphenylene ether, but preferably further comprises a crosslinking agent and an organic peroxide, and may further comprise a thermoplastic resin, a flame retardant, another additive, silica filler, solvent, and the like, as desired. Components of the thermosetting composition according to the present embodiment are described below.

(Polyphenylene Ether)

As mentioned above, the polyphenylene ether according to the present embodiment may be used as a stand-alone resin in a thermosetting composition, may be used or in combination with polyphenylene ether having another structure, and may be used in combination with various known additives.

When used in combination with other components, the content of the polyphenylene ether in the thermosetting composition is preferably 0.5 mass % to 95 mass %, more preferably 20 mass % to 93 mass %, and even more preferably 40 mass % to 90 mass %.

(Crosslinking Agent)

In the thermosetting composition according to the present embodiment, any crosslinking agent capable of causing or promoting a crosslinking reaction may be used.

The crosslinking agent preferably has a number average molecular weight of 4,000 or less. When the number average molecular weight of the crosslinking agent is 4,000 or less, an increase in viscosity of the thermosetting composition may be suppressed and good resin flowability during heat molding may be obtained.

The number average molecular weight may be a value measured by a general molecular weight measurement method, and specifically may be a value measured by gel permeation chromatography (GPC).

In view of a crosslinking reaction, the crosslinking agent preferably has an average of two or more carbon-carbon unsaturated double bonds per molecule. The crosslinking agent may consist of one compound or two or more compounds.

The term "carbon-carbon unsaturated double bond" as used herein refers to a double bond located at an end of a branch from the main chain when the crosslinking agent is a polymer or oligomer. A carbon-carbon unsaturated double bond is, for example, a 1,2-vinyl bond in polybutadiene.

When the number average molecular weight of the crosslinking agent is less than 600, the number of carbon-carbon unsaturated double bonds per molecule (average value) of the crosslinking agent is preferably 2 to 4. When the number average molecular weight of the crosslinking agent is from 600 to less than 1,500, the number of carbon-carbon unsaturated double bonds per molecule (average value) of the crosslinking agent is preferably 4 to 26. When the number average molecular weight of the crosslinking agent is from 1,500 to less than 4,000, the number of carbon-carbon unsaturated double bonds per molecule (average value) of the crosslinking agent is preferably 26 to 60. When the number average molecular weight of the crosslinking agent is in an above range and the number of carbon-carbon unsaturated double bonds is equal to or greater than a value specified above, the thermosetting composition according to the present embodiment may further increase reactivity of the crosslinking agent and further improve crosslink density of the cured material of the thermosetting composition, resulting in even better heat resistance. On the other hand, when the number-average molecular weight of the crosslinking agent is in an above range and the number of carbon-carbon unsaturated double bonds is equal to or less than a value specified above, even better resin flowability may be provided during heat molding.

Crosslinking agents include, for example, a trialkenyl isocyanurate compound such as triallyl isocyanurate (TAIC), a trialkenyl cyanurate compound such as triallyl cyanurate (TAC), a multifunctional methacrylate compound having two or more methacryl groups in the molecule, a multifunctional acrylate compound having two or more acryl groups in the molecule, a multifunctional vinyl compound such as polybutadiene having two or more vinyl groups in the molecule, a vinylbenzyl compound such as divinylbenzene having a vinylbenzyl group in the molecule, a multifunctional maleimide compound having two or more maleimide groups in the molecule such as 4,4'-bismaleimidodiphenylmethane, and the like. One such crosslinking agent may be used alone and two or more may be used in combination. Among these, the crosslinking agent preferably includes at least one compound selected from the group consisting of triallyl cyanurate, triallyl isocyanurate, and polybutadiene. When the crosslinking agent comprises at least one or more of the compounds described above, the thermosetting composition tends to have even better compatibility and coatability between the crosslinking agent and the polyphenylene ether, and even better substrate properties when mounted on an electronic circuit board.

The mass ratio of the polyphenylene ether to the crosslinking agent (polyphenylene ether:crosslinking agent), in view of compatibility between the crosslinking agent and the modified polyphenylene ether, coatability of the thermosetting composition, and further improved properties of a mounted electronic circuit board, is preferably from 25:75 to 95:5 and more preferably from 32:68 to 85:15.

(Organic Peroxide)

According to the present embodiment, any organic peroxide may be used that has an ability to promote the polymerization reaction of the thermosetting composition comprising the polyphenylene ether and the crosslinking agent. Organic peroxides include, for example, benzoyl peroxide, cumene hydroperoxide, 2,5-dimethylhexane-2,5-dihydroperoxide, 2,5-dimethyl-2,5-di(t-butylperoxy)hexyne-3, di-t-butylperoxide, t-butylcumyl peroxide, di(2-t-butylperoxyisopropyl)benzene, 2,5-dimethyl-2,5-di(t-butylperoxy)hexane, dicumylperoxide, di-t-butylperoxyisophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilyl triphenylsilyl peroxide, and the like. A radical precursor such as 2,3-dimethyl-2,3-diphenylbutane may be used as a reaction initiator for the thermosetting composition. Among these, in view of providing a cured product having excellent heat resistance and mechanical properties and a low dielectric loss tangent (preferably a low dielectric constant), 2,5-dimethyl-2,5-di(t-butylperoxy)hexyne-3, di(2-t-butylperoxyisopropyl)benzene, and 2,5-dimethyl-2,5-di(t-butylperoxy)hexane are preferred.

A one-minute half-life temperature of the organic peroxide is preferably 155° C. to 185° C., more preferably 160° C. to 180° C., and even more preferably 165° C. to 175° C. A one-minute half-life temperature of the organic peroxide in the range 155° C. to 185° C. tends to further improve the compatibility of the organic peroxide with modified PPE, the coatability of the thermosetting composition, and the properties of a mounted electronic circuit board.

In the present description, the one-minute half-life temperature is a temperature at which the organic peroxide decomposes and an amount of reactive oxygen halves in one minute. The one-minute half-life temperature is a value confirmed by dissolving the organic peroxide in a solvent that is inert to radicals, such as benzene, to a concentration from 0.05 mol/L to 0.1 mol/L, and pyrolyzing the organic peroxide solution in a nitrogen atmosphere.

Organic peroxides having a one-minute half-life temperature in the range from 155° C. to 185° C. include, for example, t-hexylperoxyisopropyl monocarbonate (155.0° C.), t-butylperoxy-3,5,5-trimethylhexanoate (166.0° C.), t-butylperoxy laurate (159.4° C.), t-butylperoxyisopropyl monocarbonate (158.8° C.), t-butylperoxy 2-ethylhexyl monocarbonate (161.4° C.), t-hexyl peroxybenzoate (160.3° C.), 2,5-dimethyl-2,5-di(benzoylperoxy)hexane (158.2° C.), t-butyl peroxyacetate (159.9° C.), 2,2-di-(t-butylperoxy)butane (159.9° C.), t-butylperoxybenzoate (166.8° C.), n-butyl 4,4-di-(t-butylperoxy)valerate (172.5° C.) di(2-t-butylperoxyisopropyl)benzene (175.4° C.), dicumylperoxide (175.2° C.), di-t-hexyl peroxide (176.7° C.), 2,5-dimethyl-2,5-di(t-butylperoxy)hexane (179.8° C.), t-butylcumyl peroxide (173.3° C.), and the like.

Content of the organic peroxide, based on a total of 100 parts by mass of the polyphenylene ether and the crosslinking agent combined, in view of compatibility between the organic peroxide and the modified PPE and superior coatability of the thermosetting composition, is preferably at least 0.05 parts by mass, more preferably at least 0.5 parts by mass, and even more preferably at least 1 part by mass, and even more preferably at least 1.5 parts by mass. In view of superior substrate properties when the thermosetting composition is mounted on an electronic circuit board, the content of the organic oxide is preferably 5 parts by mass or less, and more preferably 4.5 parts by mass or less.

(Thermoplastic Resin)

A thermoplastic resin is preferably at least one of the group consisting of a block copolymer of a vinyl aromatic compound and an olefinic alkene compound and a hydrogenated product thereof (a hydrogenated block copolymer obtained by hydrogenation of a block copolymer of a vinyl aromatic compound and an olefinic alkene compound), and a homopolymer of a vinyl aromatic compound.

A weight average molecular weight of the thermoplastic resin, in view of compatibility with the polyphenylene ether, resin flowability, coatability of the thermosetting composition, and heat resistance during curing, is preferably more than 50,000 to 780,000 or less, more preferably from 60,000 to 750,000, and even more preferably from 70,000 to 700,000.

When the thermosetting composition contains the polyphenylene ether, a crosslinking agent, an organic peroxide, and a thermoplastic resin of the type and weight average molecular weight described above, the compatibility of the modified PPE with the other components and the coatability on a substrate and the like tends to be good, which in turn may lead to excellent substrate properties when incorporated in an electronic circuit board.

The weight average molecular weight is determined by a method described with reference to an example below.

A lower limit of vinyl aromatic compound derived unit content of the block copolymer or hydrogenated product thereof is preferably 20 mass % or more, and in increasing preference, 22 mass % or more, 24 mass % or more, 26 mass % or more, 28 mass % or more, 30 mass % or more, 32 mass % or more. An upper limit is preferably 70 mass % or less, and in increasing preference 69 mass % or less, 68 mass % or less, 67 mass % or less. When the vinyl aromatic compound derived unit content of the block copolymer or hydrogenated product thereof is from 20 mass % to 70 mass %, the compatibility with modified polyphenylene ether is further improved and/or adhesion strength with a metal foil tends to be further improved.

The vinyl aromatic compound may have an aromatic ring and a vinyl group in the molecule, such as styrene.

An olefinic alkene compound may be any alkene having a linear or branched structure in the molecule, such as ethylene, propylene, butylene, isobutylene, butadiene, and isoprene.

Thermoplastic resin, in view of further improvement of compatibility with the polyphenylene ether, is preferably at least one species selected from the group consisting of styrene-butadiene block copolymers, styrene-ethylene-butadiene block copolymers, styrene-ethylene-butylene block copolymers, styrene-butadiene-butylene block copolymers, styrene-isoprene block copolymers, styrene-ethylene-propylene block copolymers, styrene-isobutylene block copolymers, hydrogenated styrene-butadiene block copolymers, hydrogenated styrene-ethylene-butadiene block copolymers, hydrogenated styrene-butadiene-butylene block copolymers, hydrogenated styrene-isoprene block copolymers, and styrene homopolymers (polystyrene), and more preferably at least one species selected from the group consisting of styrene-butadiene block copolymers, hydrogenated styrene-butadiene block copolymers, and polystyrene.

A hydrogenation ratio of the above hydrogenated products is not particularly limited, and some carbon-carbon unsaturated double bonds derived from olefinic alkene compounds may remain.

The content of thermoplastic resin with respect to 100 parts by mass of the polyphenylene ether and the crosslinking agent combined, is preferably 2 to 20 parts by mass, more preferably 3 to 19 parts by mass, even more preferably 4 to 18 parts by mass, and even more preferably 5 to 17 parts by mass. According to content in the above numerical ranges, the thermosetting composition of the present embodiment tends to have even better compatibility with the thermoplastic resin and modified polyphenylene ether and coatability, and even better substrate properties when mounted on an electronic circuit board.

The thermosetting composition of the present embodiment may also contain a thermoplastic resin other than the thermoplastic resin species having the weight average molecular weights described above.

(Flame Retardant)

The thermosetting composition according to the present embodiment preferably comprises a flame retardant. From the viewpoint of being able to improve heat resistance, the flame retardant is not particularly limited as long as the flame retardant is incompatible with other components in the thermosetting composition after curing of the thermosetting composition. Preferably, the flame retardant is incompatible with the polyphenylene ether and/or the crosslinking agent in the thermosetting composition after curing of the thermosetting composition.

Flame retardants include, for example: inorganic flame retardants such as antimony trioxide, aluminum hydroxide, magnesium hydroxide, and zinc borate; aromatic bromine compounds such as hexabromobenzene, decabromodiphenyl ethane, 4,4-dibromobiphenyl, ethylene bis(tetrabromophthalimide); phosphorus-based flame retardants such as resorcinol bis(diphenyl phosphate), resorcinol bis(dixylenyl phosphate); and the like. One such flame retardant may be used alone and two or more may be used in combination. Among these, decabromodiphenyl ethane is preferred as the flame retardant in view of compatibility between the flame retardant and modified PPE, coatability of the thermosetting composition, and further improvement in properties of a mounted electronic circuit board.

Content of the flame retardant is not particularly limited, but in view of maintaining a V-0 level of flame retardance according to the UL 94 Standard, content with respect to a total of 100 parts by mass of the polyphenylene ether and the crosslinking agent is preferably 5 parts by mass or more, more preferably 10 parts by mass or more, and even more preferably 15 parts by mass or more. In view of being able to maintain a low dielectric loss tangent of resulting cured material (and preferably also a low dielectric constant), the content of the flame retardant is preferably 50 parts by mass or less, more preferably 45 parts by mass or less, and even more preferably 40 parts by mass or less.

(Silica Filler)

The thermosetting composition according to the present embodiment may comprise silica filler. Silica fillers include, for example, natural silica, fused silica, synthetic silica, amorphous silica, Aerosil, hollow silica, and the like.

The silica filler content may be 10 to 100 parts by mass relative to 100 parts by mass of the total of the polyphenylene ether and crosslinking agent. The silica filler may be surface treated with a silane coupling agent or the like on a surface thereof.

In addition to the flame retardant and silica filler, the thermosetting composition according to the present embodiment may further comprise an additive such as a thermal stabilizer, an antioxidant, an ultraviolet (UV) absorber, a surfactant, a lubricants, a solvent, and the like.

When comprising a solvent, the thermosetting composition according to the present embodiment may be in the form of a varnish in which solid components in the thermosetting composition are dissolved or dispersed in the solvent, and further, a resin film may be formed from the thermosetting composition according to the present embodiment.

(Solvent)

In view of solubility, an aromatic compound such as toluene, xylene, and the like, methyl ethyl ketone (MEK), cyclopentanone, cyclohexanone, chloroform, and the like are preferred solvents. One such solvent may be used alone and two or more solvents may be used in combination.

(Prepreg)

A prepreg according to the present embodiment is a composite comprising a base material and the thermosetting composition, and preferably comprises the base material and the thermosetting composition impregnated or applied to the base material. The prepreg is obtained, for example, by impregnating the base material such as glass cloth with a varnish of the thermosetting composition, then drying and removing solvent content using a hot-air dryer or the like.

Base materials include various types of glass cloth such as roving cloth, cloth, chopped mat, surfacing mat, and the like; asbestos cloth, metallic fiber cloth, and other synthetic or natural inorganic fiber cloth; woven or non-woven fabrics made from liquid crystal fibers such as fully aromatic polyamide fiber, fully aromatic polyester fiber, polybenzoxazole fiber, and the like; natural fiber fabrics such as cotton fabrics, hemp fabrics, felt, and the like; natural cellulose-based base materials such as carbon fiber fabric, kraft paper, cotton paper, cloth obtained from paper-glass blend yarn, and the like; porous polytetrafluoroethylene films; and the like. Among these, glass cloth is preferred. One such base material may be used alone and two or more may be used in combination.

A ratio of the thermosetting composition solid content (component other than solvent of the thermosetting composition) in the prepreg is preferably 30 mass % to 80 mass %, and more preferably 40 mass % 70 mass %. When the ratio is 30 mass % or more, the prepreg tends to have even better insulation reliability when used for an electronic substrate and the like. The ratio of 80 mass % or less tends to further improve mechanical properties such as flexural modulus in applications such as electronic substrates.

<Laminate>

A laminate according to the present embodiment is preferably a metal clad laminate comprising a cured product of the prepreg and a metal foil, and is obtained by laminating and curing the thermosetting composition or the prepreg and the metal foil. The metal clad laminate is preferably in the form of a prepreg cured material (hereinafter also referred to as "cured composite") and the metal foil laminated and adhered together, and is suitable for use as a material for an electronic substrate.

Examples of metal foil include aluminum foil and copper foil, of which copper foil is preferred for low electrical resistance.

The cured composite to be combined with metal foil may be one or more sheets, and is processed into a laminate by overlapping the metal foil on one or both sides of the composite, depending on the application.

For example, a method of producing the metal clad laminate comprises forming a composite body consisting of the thermosetting composition and a base material (for example, the prepreg described above), layering with a metal foil, and then curing the thermosetting composition to obtain a laminate in which the cured laminate and the metal foil are laminated.

One particularly preferred application for the metal clad laminate is a printed circuit board. The printed circuit board preferably has at least a portion of the metal foil removed from the metal clad laminate.

<Printed Circuit Board>

At least a portion of the metal foil may be removed from the metal clad laminate to make a printed circuit board. The printed circuit board may typically be formed by pressure thermoforming using the prepreg according to the present embodiment. A base material may be the same as described above in reference to the prepreg.

By including the thermosetting composition of the present embodiment, the printed circuit board has excellent heat resistance and electrical properties (low dielectric loss tangent and/or dielectric constant), and further, suppressing fluctuations in electrical properties due to environmental changes is possible, and furthermore, the printed circuit board has excellent insulation reliability and mechanical properties.

EXAMPLES

The following is a more detailed description of the present embodiment based on examples, but the present embodiment is not limited to the following examples.

First, measurement methods and evaluation criteria for each property and evaluation are described below.

(1) Molar Ratio of Repeating Units Derived from Phenol of Formula (1) or Formula (2) to the Sum of Repeating Units Derived from Phenol of Formula (1) and Formula (2) Included in Unmodified Polyphenylene Ether The unmodified polyphenylene ether obtained in the examples and comparative examples was dissolved in heavy chloroform and $^{1}H$ NMR measurements (500 MHz, manufactured by JEOL Ltd.) were performed using tetramethylsilane as an internal standard. In the measurements, the polyphenylene ether was kept at 140° C. and 1 mmHg for 8 hours in advance to remove volatile components such as toluene and water, and the measurement was performed as dry unmodified polyphenylene ether. Signals of units derived from phenols of Formula (1) and Formula (2) were identified and respective ratios were calculated.

For example, in the unmodified polyphenylene ethers obtained in the examples and comparative examples, a signal attribution method of a repeating unit derived from phenol of Formula (1), that is, a signal derived from a 2,6-dimethylphenol derived structure (2,6-dimethylphenylene unit) and a repeating unit derived from phenol of Formula (2), that is, a signal derived from a 2-tert-butyl-5-methylphenol derived structure (2-tert-butyl-5-methylphenylene unit) was analyzed as follows. Repeat unit peaks derived from each phenol appear in the following regions.

Peaks (6H and 3H, respectively) derived from a hydrogen atom of a methyl group of the 2,6-dimethylphenylene unit and the 2-tert-butyl-5-methylphenylene unit: 1.60 ppm to 2.50 ppm (excluding peaks derived from a hydrogen atom of a methyl group of toluene)

Peaks (9H) derived from a hydrogen atom of a tert-butyl group of the 2-tert-butyl-5-methylphenylene unit: 1.00 ppm to 1.52 ppm (excluding peaks derived from a hydrogen atom of water)

By examining integrals of the signals, integral per proton of peaks derived from the hydrogen atom of the methyl group of the 2,6-dimethylphenylene unit may be obtained using the following Equation (1).

$$E=\{C-3\times(D/9)\}6 \quad \text{Equation (1)}$$

C: Integral of methyl derived peaks of 2,6-dimethylphenylene unit and 2-tert-butyl-5-methylphenylene unit D: Integral of tert-butyl derived peaks of 2-tert-butyl-5-methylphenylene unit E: Integral per proton of methyl derived peaks of 2,6-dimethylphenylene unit Further, a ratio (mol %) of repeating units derived from phenol of Formula (1) or Formula (2) may be calculated using Equation (2) and Equation (3) below.

$$\text{Ratio (mol \%) of repeating units derived from phenol of Formula (1)}=E/\{(D/9)+E\}\times 100 \quad \text{Equation (2)}$$

$$\text{Ratio (mol \%) of repeating units derived from phenol of Formula (2)}=(D/9)/\{(D/9)+E\}\times 100 \quad \text{Equation (3)}$$

(2) Molar Ratio of Repeating Units Derived from Impurity A to the Sum of Repeating Units Derived from Phenol of Formula (1), Repeating Units Derived from Phenol of Formula (2), and Repeating Units Derived from Impurity A Included in Unmodified Polyphenylene Ether The unmodified polyphenylene ether obtained in the examples and comparative examples was dissolved in heavy chloroform and $^1$H NMR measurements (500 MHz, manufactured by JEOL Ltd.) were performed using tetramethylsilane as an internal standard. In the measurements, the polyphenylene ether was kept at 140° C. and 1 mmHg for 8 hours in advance to remove volatile components such as toluene and water, and the measurement was performed as dry unmodified polyphenylene ether. The signals of units derived from phenols of Formula (1), Formula (2), and impurity A were identified and respective ratios were calculated.

For example, in the unmodified polyphenylene ethers obtained in the examples and comparative examples, a signal attribution method of a repeating unit derived from phenol of Formula (1), that is, a signal derived from a 2,6-dimethylphenol derived structure (2,6-dimethylphenylene unit), and a repeating unit derived from phenol of Formula (2), that is, a signal derived from a 2-tert-butyl-5-methylphenol derived structure (2-tert-butyl-5-methylphenylene unit), and a repeating unit derived from impurity A, that is, a signal derived from a repeating unit in Formula (11), where $R^{11}$=methyl group, $R^{12}$=hydrogen atom and z=0, was analyzed as follows. Repeat unit peaks derived from each phenol appear in the following regions.

Peaks (6H, 3H, and 12H, respectively) derived from a hydrogen atom of a methyl group of the 2,6-dimethylphenylene unit, the 2-tert-butyl-5-methylphenylene unit, and a signal derived from the repeating unit of Formula (11) where $R^{11}$=methyl group, $R^{12}$=hydrogen atom, and z=0:1.60 ppm to 2.50 ppm (excluding peaks derived from a hydrogen atom of a methyl group of toluene)

Peaks (9H) derived from a hydrogen atom of a tert-butyl group of the 2-tert-butyl-5-methylphenylene unit: 1.00 ppm to 1.52 ppm (excluding peaks derived from a hydrogen atom of water)

Peaks (4H) derived from a hydrogen atom of a methyl group of the repeating unit of Formula (11) where $R^{11}$=methyl group, $R^{12}$=hydrogen atom and z=0:7.35 ppm By examining integrals of the signals, integral per proton of peaks derived from the hydrogen atom of the methyl group of the 2,6-dimethylphenylene unit may be obtained using the following Equation (4).

$$E=\{C-3\times(D/9)-12\times(F/4)\}/6 \quad \text{Equation (4)}$$

C: Integral of methyl derived peaks of 2,6-dimethylphenylene unit and 2-tert-butyl-5-methylphenylene unit D: Integral of tert-butyl derived peaks of 2-tert-butyl-5-methylphenylene unit F: Integral of peaks derived from the hydrogen atom of the benzene ring of the repeating unit of Formula (11), where $R^{11}$=methyl group, $R^{12}$=hydrogen atom and z=0

E: Integral per proton of methyl derived peaks of 2,6-dimethylphenylene unit

Further, the following Equation (5) may be used to calculate the ratio (mol %) of structures in Formula (11) where $R^{11}$=methyl group, $R^{12}$=hydrogen atom, and z=0.

$$\text{Ratio (mol \%) of repeating units of Formula (11) where } R^{11} \text{ is a methyl group, } R^{12} \text{ is a hydrogen atom and z is } 0=(F/4)/\{(D/9)+E+(F/4)\}\times 100 \quad \text{Equation (5)}$$

(3) Molar Ratio of a Repeating Unit Derived from a Monohydric Phenol Having at Least One Unsaturated Hydrocarbon Group on a Carbon Atom Ortho Position to a Carbon Atom to which a Hydroxyl Group of Phenol is Bonded with Respect to a Sum of the Repeating Unit Derived from Phenol of Formula (1) and the Repeating Unit Derived from the Monohydric Phenol Having at Least One Unsaturated Hydrocarbon Group on the Carbon Atom Ortho Position to the Carbon Atom to which the Hydroxyl Group of Phenol is Bonded The unmodified polyphenylene ether obtained in the examples and comparative examples was dissolved in heavy chloroform and $^1$H NMR measurements (500 MHz, manufactured by JEOL Ltd.) were performed using tetramethylsilane as an internal standard. In the measurements, the polyphenylene ether was kept at 140° C. and 1 mmHg for 8 hours in advance to remove volatile components such as toluene and water, and the measurement was performed as dry unmodified polyphenylene ether. The signals of repeating units derived from phenol of Formula (1), repeating units derived from phenol of Formula (2), and repeating units derived from monohydric phenol having at least one unsaturated hydrocarbon group on a carbon atom ortho position to the carbon atom to which a hydroxyl group of phenol is bonded were identified and ratios were calculated.

For example, in the unmodified polyphenylene ethers obtained in the examples and comparative examples, a repeating unit derived from phenol of Formula (1), that is, a signal derived from a 2,6-dimethylphenol derived structure (2,6-dimethylphenylene unit), a repeating unit derived from phenol of Formula (2), that is, a signal derived from a 2-tert-butyl-5-methylphenol derived structure (2-tert-butyl-5-methylphenylene unit), and a repeating unit derived from monohydric phenol having at least one unsaturated hydrocarbon group on a carbon atom ortho position to a carbon atom to which a hydroxyl group of phenol is bonded, that is, a signal derived from 2-allylphenol derived structure (2-allylphenylene unit), appear in the following regions.

Peaks (6H and 3H, respectively) derived from a hydrogen atom of a methyl group of the 2,6-dimethylphenylene unit and the 2-tert-butyl-5-methylphenylene unit: 1.60 ppm to 2.50 ppm (excluding peaks derived from a hydrogen atom of a methyl group of toluene)

Peaks (9H) derived from a hydrogen atom of a tert-butyl group of the 2-tert-butyl-5-methylphenylene unit: 1.00 ppm to 1.52 ppm (excluding peaks derived from a hydrogen atom of water)

Peaks (2H) derived from a hydrogen atom of a methylene group of the 2-allylphenylene unit: 3.40 ppm By examining integrals of the signals, integral per proton of peaks derived from the hydrogen atom of the methyl group of the 2,6-dimethylphenylene unit may be obtained using the following Equation (6).

$$E=\{C-3\times(D/9)\}/6 \qquad \text{Equation (6)}$$

C: Integral of methyl derived peaks of 2,6-dimethylphenylene unit and 2-tert-butyl-5-methylphenylene unit D: Integral of tert-butyl derived peaks of 2-tert-butyl-5-methylphenylene unit E: Integral per proton of methyl derived peaks of 2,6-dimethylphenylene unit Further, a ratio (mol %) of 2-allylphenylene units may be calculated using the following Equation (7).

$$\text{Ratio (mol \%) of 2-allylphenylene units}=(G/2)/\{E+(G/2)\}\times100 \qquad \text{Equation (7)}$$

G: Integral per proton of peaks derived from the methylene group of the 2-allylphenylene unit (4) Molar Ratio of Repeating Units Derived from Phenol of Formula (1) or Formula (2) to the Sum of Repeating Units Derived from Phenol of Formula (1) and Formula (2) Included in Modified Polyphenylene Ether Modified polyphenylene ether was realized as follows.

The modified polyphenylene ether obtained in the examples and comparative examples was dissolved in a measurement solvent (heavy chloroform to which a drop of heavy water was added to eliminate hydroxyl groups), and $^1$H-NMR measurements (500 MHz, manufactured by JEOL Ltd.) were performed using tetramethylsilane as an internal standard. In the measurements, the polyphenylene ether was kept at 80° C. and 1 mmHg for 8 hours in advance to remove volatile components such as toluene and water, and the measurement was performed as a dry modified polyphenylene ether. Signals of units derived from phenols of Formula (1) and Formula (2) were identified and respective ratios were calculated.

For example, in the modified polyphenylene ethers obtained in the examples and comparative examples, a signal attribution method of a repeating unit derived from phenol of Formula (1), that is, a signal derived from a 2,6-dimethylphenol derived structure (2,6-dimethylphenylene unit), a repeating unit derived from phenol of Formula (2), that is, a signal derived from a 2-tert-butyl-5-methylphenol derived structure (2-tert-butyl-5-methylphenylene unit), and a signal derived from a moiety structure selected from the group consisting of Formula (4), Formula (5), Formula (6), and Formula (7), that is, a methacryl group derived structure, was analyzed as follows. Repeat unit peaks derived from each phenol appear in the following regions.

Peaks (6H, 3H, and 3H, respectively) derived from a hydrogen atom of a methyl group of the 2,6-dimethylphenylene unit, the 2-tert-butyl-5-methylphenylene unit, and the methacryl group: 1.60 ppm to 2.50 ppm (excluding peaks derived from a hydrogen atom of a methyl group of toluene)

Peaks (9H) derived from a hydrogen atom of a tert-butyl group of the 2-tert-butyl-5-methylphenylene unit: 1.00 ppm to 1.52 ppm (excluding peaks derived from a hydrogen atom of water)

Peaks (1H) derived from a hydrogen atom of one of the methylene groups of the methacryl group: 4.4 ppm to 5.8 ppm By examining integrals of the signals, integral per proton of peaks derived from the hydrogen atom of the methyl group of the 2,6-dimethylphenylene unit may be obtained using the following Equation (8).

$$E=\{C-3\times(D/9)-3\times(H/1)\}/6 \qquad \text{Equation (8)}$$

C: Integral of methyl derived peaks of 2,6-dimethylphenylene unit and 2-tert-butyl-5-methylphenylene unit D: Integral of tert-butyl derived peaks of 2-tert-butyl-5-methylphenylene unit E: Integral per proton of methyl derived peaks of 2,6-dimethylphenylene unit H: Integral of peaks derived from a hydrogen atom of one of the methylene groups of the methacryl group Further, a ratio (mol %) of repeating units derived from phenol of Formula (1) or Formula (2) may be calculated using Equation (9) and Equation (10) below.

$$\text{Ratio (mol \%) of repeating units derived from phenol of Formula (1)}=E/\{(D/9)+E\}\times100 \qquad \text{Equation (9)}$$

$$\text{Ratio (mol \%) of repeating units derived from phenol of Formula (2)}=(D/9)/\{(D/9)+E\}\times100 \qquad \text{Equation (10)}$$

(5) Molar Ratio of Repeating Units Derived from Impurity A to the Sum of Repeating Units Derived from Phenol of Formula (1), Repeating Units Derived from Phenol of Formula (2), and Repeating Units Derived from Impurity A Included in Modified Polyphenylene Ether The modified polyphenylene ether obtained in the examples and comparative examples was dissolved in a measurement solvent (heavy chloroform to which a drop of heavy water was added to eliminate hydroxyl groups), and $^1$H NMR measurements (500 MHz, manufactured by JEOL Ltd.) were performed using tetramethylsilane as an internal standard. In the measurements, the polyphenylene ether was kept at 80° C. and 1 mmHg for 8 hours in advance to remove volatile components such as toluene and water, and the measurement was performed as dry, modified polyphenylene ether. The signals of units derived from phenols of Formula (1), Formula (2), and impurity A were identified and respective ratios were calculated.

For example, in the modified polyphenylene ethers obtained in the examples and comparative examples, a signal attribution method of a repeating unit derived from phenol of Formula (1), that is, a signal derived from a 2,6-dimethylphenol derived structure (2,6-dimethylphenylene unit), a repeating unit derived from phenol of Formula (2), that is, a signal derived from a 2-tert-butyl-5-methylphenol derived structure (2-tert-butyl-5-methylphenylene unit), a signal derived from a moiety structure selected from the group consisting of Formula (4), Formula (5), Formula (6), and Formula (7), that is, a methacryl group derived structure, and a repeating unit derived from impurity A, that is, a signal derived from a repeating unit of Formula (11), where $R^{11}$=methyl group, $R^{12}$=hydrogen atom, and z=0, was analyzed as follows. Repeat unit peaks derived from each phenol appear in the following regions.

Peaks (6H, 3H, 12H, and 3H, respectively) derived from a hydrogen atom of a methyl group of the 2,6-dimethylphenylene unit, the 2-tert-butyl-5-methylphenylene unit, a signal derived from the repeating unit of Formula (11), where $R^{11}$=methyl group, $R^{12}$=hydrogen atom, and z=0, and a signal derived from the methacryl group: 1.60 ppm to 2.50 ppm (excluding peaks derived from a hydrogen atom of a methyl group of toluene)

Peaks (9H) derived from a hydrogen atom of a tert-butyl group of the 2-tert-butyl-5-methylphenylene unit: 1.00 ppm to 1.52 ppm (excluding peaks derived from a hydrogen atom of water)

Peaks (4H) derived from a hydrogen atom of a methyl group of the repeating unit of Formula (11) where $R^{11}$=methyl group, $R^{12}$=hydrogen atom and z=0:7.35 ppm Peaks (1H) derived from a hydrogen atom of one of the methylene groups of the methacryl group: 4.4 ppm to 5.8 ppm By examining integrals of the signals, integral per proton of peaks derived from the hydrogen atom of the methyl group of the 2,6-dimethylphenylene unit may be obtained using the following Equation (11).

$$E=\{C-3\times(D/9)-12\times(F/4)-3\times(H/1)\}/6 \qquad \text{Equation (11)}$$

C: Integral of methyl derived peaks of 2,6-dimethylphenylene unit and 2-tert-butyl-5-methylphenylene unit D: Integral of tert-butyl derived peaks of 2-tert-butyl-5-methylphenylene unit F: Integral of peaks derived from the hydrogen atom of the benzene ring of the repeating unit of Formula (11), where $R^{11}$=methyl group, $R^{12}$=hydrogen atom and z=0

E: Integral per proton of methyl derived peaks of 2,6-dimethylphenylene unit

H: Integral of peaks derived from a hydrogen atom of one of the methylene groups of the methacryl group Further, the following Equation (12) may be used to calculate the ratio (mol %) of structures in Formula (11) where $R^{11}$=methyl group, $R^{12}$=hydrogen atom, and z=0.

$$\text{Ratio (mol \%) of repeating units in Formula (11) where } R^{11} \text{ is a methyl group, } R^{12} \text{ is a hydrogen atom and z is } 0=(F/4)/\{(D/9)+E+(F/4)\}\times 100 \qquad \text{Equation (12)}$$

(6) Reduced Viscosity (ηsp/c)

A 0.5 g/dL chloroform solution of polyphenylene ether was prepared and reduced viscosity (ηsp/c) (dL/g) at 30° C. was determined using an Ubbelohde viscometer.

(7) Average Number of Hydroxyl Groups in Polyphenylene Ether 5.0 mg of polyphenylene ether was weighed. The weighed polyphenylene ether was then dissolved in 25 mL of methylene chloride. After adding 150 μL of an ethanol solution of 2 mass % tetraethylammonium hydroxide (TEAH) to 2.0 mL of the prepared solution, absorbance (Abs) was measured at 318 nm using a UV spectrophotometer (Hitachi, Ltd.: Model U-3210) (1 cm cell length absorbance measurement cell). Based on the measurement results, a hydroxyl group equivalent obtained from the absorbance was determined using the following Equation (13). The average number of hydroxyl groups per molecule of polyphenylene ether was calculated using the number average molecular weight determined by gel permeation chromatography (details are described under (8) below).

$$\text{Hydroxyl group equivalent (g/mol) obtained from absorbance}=[(\varepsilon\times 5)/(25\times \text{Abs})] \qquad \text{Equation (13)}$$

(Where ε is the light absorption coefficient, which is 4700 L/mol cm.)

$$\text{Average number of hydroxyl groups per molecule of polyphenylene ether (pcs/molecule)}=(\text{average molecular weight determined by gel permeation chromatography})/(\text{hydroxyl group equivalent obtained from absorbance}) \qquad \text{Equation (14)}$$

(8) Number Average Molecular Weight (Mn)

Gel Permeation Chromatography System 21 manufactured by Showa Denko K.K. was used as the measurement device. A calibration curve was prepared using standard polystyrene and ethylbenzene, and the obtained number average molecular weight (Mn) of modified polyphenylene ether was measured using the calibration curve. Standard polystyrene having molecular weights of 3,650,000, 2,170,000, 1,090,000, 681,000, 204,000, 52,000, 30,200, 13,800, 3,360, 1,300, and 550 were used.

Two K-805L columns manufactured by Showa Denko K.K. were used, connected in series. Chloroform was used as the solvent, the solvent flow rate was 1.0 mL/min, and the column temperature was 40° C. A 1 g/L chloroform solution of modified polyphenylene ether was prepared and used as the measurement sample. A wavelength of UV in the detection unit was 254 nm for standard polystyrene and 283 nm for polyphenylene ether.

The number average molecular weight (Mn) (g/mol) was calculated from a ratio of peak areas based on a curve indicating molecular weight distribution obtained by GPC based on the measurement data.

(9) Long-Term Solubility in Methyl Ethyl Ketone (MEK Solubility)

1.5 g of polyphenylene ether and 8.5 g of methyl ethyl ketone were weighed in a clear glass screw tube. The mixture was mixed at 20° C. using a stir bar and a magnetic stirrer. After one day, the solution was judged "circle" (good) if it remained clear, "cross" (poor) if clearly not dissolved or there was a large amount of insoluble content, and "triangle" if there was some residual solution (slight turbidity).

(10) Long-Term Solubility in Toluene (TL Solubility)

2 g of polyphenylene ether and 8 g of toluene were weighed into a clear glass screw tube. The mixture was mixed at 20° C. using a stir bar and a magnetic stirrer. After one day, the solution was judged "circle" (good) if it remained clear, "cross" (poor) if clearly not dissolved or there was a large amount of insoluble content, and "triangle" if there was some residual solution (slight turbidity).

(11) Dielectric Loss Tangent of Cured Thermosetting Composition

A dielectric loss tangent at 10 GHz of the laminates produced in the examples and comparative examples was measured by a cavity resonance method. A network analyzer (N5230A, manufactured by Agilent Technologies) and a cavity resonator (CP Series Cavity Resonator) manufactured by Kanto Electronic Application and Development Inc. were used as the measurement devices. The laminate was cut into strips approximately 2 mm wide, 50 mm long, and 0.5 mm thick, with the warp of glass cloth as the long edge. Next, the products were placed in an oven at 105° C.±2° C. for 2 hours to dry, and then placed in an environment of 23° C. and 50%±5% relative humidity for 24 hours±5 hours. Dielectric loss tangent was then measured by using the measuring device at 23° C. and 50%±5% relative humidity.

The following is a description of methods of production of polyphenylene ether for each of the examples and comparative examples.

Example 1

In a 40 L jacketed polymerization tank equipped with a sparger for introducing oxygen-containing gas at the bottom of a polymerization tank, a stirring turbine impeller, and baffle, and a reflux condenser at a vent gas line above the polymerization tank, 2.4 g of cupric oxide, 18.1 g of 47 mass % hydrogen bromide aqueous solution, 5.8 g of di-t-butylethylenediamine, 28.1 g of di-n-butylamine, 85.6 g of butyldimethylamine, 17.9 kg of toluene, 1,497 g of 2,6-dimethylphenol, and 503 g of 2-tert-butyl-5-methylphenol were added while blowing nitrogen gas at a flow rate of 17.1 L/min to make a homogeneous solution. Next, dry air was introduced into the polymerization tank from the sparger at a rate of 10.5 L/min to start polymerization. Dry air was passed through for 120 minutes to obtain the polymerization mixture. Internal temperature was controlled to be 20° C. during polymerization. The polymerization mixture (polymerization solution) at the end of polymerization was in a homogeneous solution state.

Dry air aeration was stopped, and 25.9 g of ethylenediaminetetraacetic acid tetrasodium salt (reagent manufactured by Dojindo Molecular Technologies, Inc.) was added to the polymerization mixture as a solution in 2 kg of water. The polymerization mixture was agitated at 70° C. for 150 minutes, then allowed to stand for 20 minutes, and the organic and aqueous phases were separated by liquid-liquid separation. The organic phase was concentrated by a rotary evaporator until the polymer concentration reached 25 mass %.

The solution was mixed with methanol at a ratio of 6 to the polymer solution to precipitate the polymer. Wet polyphenylene ether was obtained by vacuum filtration using a glass filter. The wet polyphenylene ether was further washed with an amount of methanol that gave a ratio of 3 methanol to wet polyphenylene ether. The washing operation was performed three times. The wet polyphenylene ether was then kept at 140° C. and 1 mmHg for 120 minutes to obtain the polyphenylene ether in a dry state.

The obtained polyphenylene ether was subjected to each measurement by the methods described above. The results of each analysis are listed in Table 1.

Example 2

Aside from the phenol feedstock being 1,269 g of 2,6-dimethylphenol and 731 g of 2-tert-butyl-5-methylphenol, operations were carried out in the same manner as in Example 1.

The results of each analysis are listed in Table 1.

Example 3

Aside from the phenol feedstock being 853 g of 2,6-dimethylphenol and 1,147 g of 2-tert-butyl-5-methylphenol, operations were carried out in the same manner as in Example 1.

The results of each analysis are listed in Table 1.

Example 4

Aside from the phenol feedstock being 454 g of 2,6-dimethylphenol and 1,517 g of 2-tert-butyl-5-methylphenol, operations were carried out in the same manner as in Example 1.

The results of each analysis are listed in Table 1.

Example 5

Aside from the phenol feedstock being 765 g of 2,6-dimethylphenol, 1,142 g of 2-tert-butyl-5-methylphenol, and 93 g of 2-allylphenol, operations were carried out in the same manner as in Example 1.

The results of each analysis are listed in Table 1.

Example 6

Aside from the phenol feedstock being 503 g of 2,6-dimethylphenol, 1,128 g of 2-tert-butyl-5-methylphenol, and 369 g of 2-allylphenol, operations were carried out in the same manner as in Example 1.

The results of each analysis are listed in Table 1.

Example 7

As in Example 3, oxidative polymerization, copper extraction, liquid-liquid separation, and concentration using a rotary evaporator were performed, and a polymer solution having a polymer concentration of 25 mass % was used as the stock solution for the modification reaction.

In a 500 mL three-necked flask equipped with a line for introducing nitrogen gas at a top of the reactor and a reflux condenser in the vent gas line at the top of the reactor, 200 g of unmodified polyphenylene ether solution and 0.64 g of 4-dimethylaminopyridine were added after the inside of the reactor was replaced with nitrogen. While stirring, 21 mL of triethylamine was added using a syringe. Then, 10.9 mL of methacryloyl chloride was collected in a syringe and dropped into the system at room temperature. For 1 hour after the end of the drop, the flask was heated in an oil bath and stirring was continued at 90° C. The flask was then further heated in an oil bath to continue the reaction under reflux. After 4 hours from the start of reflux, heating was stopped, and after returning to room temperature, 8 g of methanol was added to stop the reaction. The reaction solution was then filtered through a glass filter to obtain a solution from which the byproduct triethylammonium salt was removed. The solution was then mixed with methanol at a ratio of 10 to the polymer solution to precipitate the polymer. Wet polyphenylene ether was obtained by vacuum filtration using a glass filter. The wet polyphenylene ether was further washed with an amount of methanol that gave a ratio of 2.5 methanol to wet polyphenylene ether. The washing operation was performed three times. The wet polyphenylene ether was then kept at 100° C. and 1 mmHg for 8 hours to obtain the polyphenylene ether in a dry state. The average number of hydroxyl groups of the polyphenylene ether was measured by the method described above, and it was confirmed that the average number of hydroxyl groups derived from the polyphenylene ether was less than 0.2 per molecule. Further, $^{1}H$ NMR measurement confirmed an olefin derived proton peak of the methacryl group, indicating that the hydroxyl group was modified to a methacryl group. The results of each analysis are listed in Table 2.

Example 8

As in Example 3, oxidative polymerization, copper extraction, liquid-liquid separation, and concentration using a rotary evaporator were performed, and a polymer solution having a polymer concentration of 25 mass % was used as the stock solution for the modification reaction.

In a 500 mL three-necked flask equipped with a temperature controller, stirring device, cooling, and dropping funnel, 200 g of unmodified polyphenylene ether solution, 24 g of chloromethylstyrene (p-chloromethylstyrene to m-chloromethylstyrene ratio of 50/50, manufactured by Tokyo Chemical Industry Co., Ltd.), and 1.0 g of tetra-n-butylammonium bromide were added. The mixture was then stirred and dissolved, and liquid temperature set at 85° C. Aqueous sodium hydroxide solution (4.2 g sodium hydroxide/104 g water) was added dropwise to the mixture in 1 hour, and stirring was continued at 85° C. for another 5 hours. Next, the resulting aqueous layer was removed using a separating funnel to obtain a toluene layer including the polymer (polymer solution). The polymer was precipitated by mixing with methanol, where the ratio of methanol to polymer solution was 10. Wet polyphenylene ether was obtained by vacuum filtration using a glass filter. The wet polyphenylene ether was further washed with an amount of washing solvent (methanol:water=80:20) that gave a ratio of 2.5 washing solvent (methanol:water=80:20) to wet polyphenylene ether. After the washing operation with the methanol-water mixture was performed three times, the wet polyphenylene ether was washed with an amount of methanol that gave a ratio of 2.5 methanol to wet polyphenylene ether. After the washing operation with methanol was performed twice, the wet polyphenylene ether was kept at 100° C. and 1 mmHg for 8 hours to obtain the polyphenylene ether in a dry state. The average number of hydroxyl groups of the polyphenylene ether was measured by the method described above, and it was confirmed that the average number of hydroxyl groups derived from the polyphenylene ether was less than 0.2 per molecule. Further, $^1$H NMR measurement confirmed a proton peak derived from the styryl group at 5 ppm to 7 ppm, indicating that the hydroxyl group was modified to a styryl group. The results of each analysis are listed in Table 2.

Example 9

As in Example 3, oxidative polymerization, copper extraction, liquid-liquid separation, and concentration using a rotary evaporator were performed, and the product was further kept at 100° C. and 1 mmHg for 2 hours to obtain polyphenylene ether in a dry state. The polyphenylene ether in the dry state was used as a raw material for the modification reaction.

In a 500 mL three-necked flask equipped with a temperature controller, stirring device, cooling, and dropping funnel, 50 g of unmodified polyphenylene ether, 150 g of tetrahydrofuran, 12.6 g of allyl bromide, and 0.8 g of benzyltributylammonium bromide were added and stirred at a liquid temperature of 25° C. Aqueous sodium hydroxide solution (4.2 g sodium hydroxide/100 mL water) was added dropwise to the mixture in 60 minutes, and stirring was continued at 25° C. for another 12 hours.

Next, after neutralizing the flask contents with a 10% hydrochloric acid aqueous solution, the polymer was precipitated by mixing with methanol, where the ratio of methanol to polymer solution was 10. Wet polyphenylene ether was obtained by vacuum filtration using a glass filter. The wet polyphenylene ether was further washed with an amount of washing solvent (methanol:water=80:20) that gave a ratio of 2.5 washing solvent (methanol:water=80:20) to wet polyphenylene ether. After the washing operation with the methanol-water mixture was performed three times, the wet polyphenylene ether was washed with an amount of methanol that gave a ratio of 2.5 methanol to wet polyphenylene ether. After the washing operation with methanol was performed twice, the wet polyphenylene ether was kept at 100° C. and 1 mmHg for 8 hours to obtain the polyphenylene ether in a dry state. The average number of hydroxyl groups of the polyphenylene ether was measured by the method described above, and it was confirmed that the average number of hydroxyl groups derived from the polyphenylene ether was less than 0.2 per molecule. Further, $^1$H NMR measurement confirmed a proton peak derived from the allyl group at 3.5 ppm to 6.5 ppm, indicating that the hydroxyl group was modified to the allyl group. The results of each analysis are listed in Table 2.

Example 10

As in Example 5, oxidative polymerization, copper extraction, liquid-liquid separation, and concentration using a rotary evaporator were performed, and the product was further maintained at 100° C. and 1 mmHg for 2 hours to obtain polyphenylene ether in a dry state. Methacrylic modification was performed in the same way as in Example 7, except that the dry polyphenylene ether was used as the raw material for the modification reaction. The average number of hydroxyl groups of the polyphenylene ether was measured by the method described above, and it was confirmed that the average number of hydroxyl groups derived from the polyphenylene ether was less than 0.2 per molecule.

Further, $^1$H NMR measurement confirmed an olefin derived proton peak of the methacryl group, indicating that the hydroxyl group was modified to a methacryl group. The results of each analysis are listed in Table 2.

Example 11

79 parts by mass of the polyphenylene ether described in Example 7, 20 parts by mass of TAIC (manufactured by Nippon Kasei Chemical Co., Ltd.) and 1 part by mass of organic peroxide (Perbutyl P, manufactured by NOF Corporation) were added to toluene, stirred and dissolved to obtain a varnish (solid content concentration 58 mass %). An L glass cloth (Style: 2116, manufactured by Asahi-Schwebel Co., Ltd.) was impregnated with the varnish, excess varnish was scraped off by passing through a specified slit, dried in a drying oven at 105° C. for a specified time, and toluene was removed to obtain the prepreg. Solid content of the thermosetting composition in the prepreg was calculated to be 52 mass % by cutting the prepreg to a defined size and comparing the mass of the prepreg to the mass of glass cloth of the same size.

A copper clad laminate was obtained by layering a defined number of the prepregs and then vacuum pressing with copper foil (GTS-MP foil, 35 μm thickness, manufactured by Furukawa Electric Co., Ltd.) on both sides of the layered prepregs. In the vacuum pressing process, pressure was first set to 40 kg/cm$^2$ while heating from room temperature at a rate of 2° C./min, then, after the temperature reached 200° C., the pressure of 40 kg/cm$^2$ and the temperature of 200° C. were maintained for 60 min.

Next, the copper foil was removed from the copper clad laminate by etching to obtain a laminate (about 0.5 mm thick).

The results of each analysis are listed in Table 3.

Example 12

A laminate was obtained in the same way as in Example 11, except that the polyphenylene ether described in Example 10 was used as the raw material.

The results of each analysis are listed in Table 3.

Comparative Example 1

In a 1.5 liter jacketed reactor equipped with a sparger for introducing oxygen-containing gas at the bottom of the reactor, a stirring turbine impeller, and a baffle, and a reflux condenser at a vent gas line at the top of the reactor, a mixture of 0.15 g of preconditioned cuprous oxide and 1.12 g of 47% hydrogen bromide, 0.36 g of N,N'-di-t-butylethylenediamine, 5.31 g of dimethyl-n-butylamine, 1.74 g of di-n-butylamine, and 491.3 g of toluene were added. Then, while stirring vigorously, air was started to be introduced into the reactor at a rate of 1.05 L/min from the sparger while oxygen was introduced at the same time and a mixed solution of 98.7 g of 2,6-dimethylphenol, 1.34 g of 2-tert-butyl-5-methylphenol, and 400.0 g of toluene was added over 60 minutes. Polymerization temperature was adjusted through a heating medium in the jacket to maintain 40° C. After 130 minutes from the start of air introduction, air ventilation was stopped, nitrogen gas was replaced in the reactor, and a 20% methanol solution including 1.03 g hydroquinone (reagent manufactured by Wako Pure Chemical Industries, Ltd.) dissolved therein was added in small amounts. After 30 minutes from the addition of the methanol solution of hydroquinone, 1.61 g of ethylenediaminetetraacetic acid tetrasodium salt tetrahydrate (reagent manufactured by Dojindo Molecular Technologies, Inc.) was added as an aqueous solution in 200 g of water. The temperature was raised to 70° C. and copper extraction was performed at 70° C. for 2 hours. An unmodified polyphenylene ether solution (organic phase) and an aqueous phase to which the catalyst metal was transferred were then separated by standing separation. The solution was mixed with methanol at a ratio of 10 to the polymer solution, to precipitate the polymer. Wet polyphenylene ether was obtained by vacuum filtration using a glass filter. The wet polyphenylene ether was further washed with an amount of methanol that gave a ratio of 2.5 methanol to wet polyphenylene ether. The washing operation was performed three times. The wet polyphenylene ether was then kept at 140° C. and 1 mmHg for 120 minutes to obtain the polyphenylene ether in a dry state.

The obtained polyphenylene ether was subjected to each measurement by the methods described above. The results of each analysis are listed in Table 1.

Comparative Example 2

Aside from the phenol feedstock being 1,973 g of 2,6-dimethylphenol and 26.8 g of 2-tert-butyl-5-methylphenol, operations were carried out in the same manner as in Example 1.

The results of each analysis are listed in Table 1.

Comparative Example 3

Aside from the phenol feedstock being 1,740 g of 2,6-dimethylphenol and 260 g of 2-tert-butyl-5-methylphenol, operations were carried out in the same manner as in Example 1.

The results of each analysis are listed in Table 1.

Comparative Example 4

In a 40 L jacketed polymerization tank equipped with a sparger for introducing oxygen-containing gas at the bottom of a polymerization tank, a stirring turbine impeller, and baffle, and a reflux condenser at a vent gas line above the polymerization tank, 4.57 g of cupric oxide, 24.18 g of 47 mass % hydrogen bromide aqueous solution, 11.00 g of di-t-butylethylenediamine, 62.72 g of di-n-butylamine, 149.92 g of butyldimethylamine, 20.65 kg of toluene, and 3.12 kg of 2,6-dimethylphenol were added while blowing nitrogen gas at a flow rate of 0.5 L/min and stirring until a homogeneous solution was made and internal temperature of the polymerization tank reached 25° C. Next, dry air was introduced into the polymerization tank from the sparger at a rate of 32.8 NL/min to start polymerization. Dry air was passed through for 140 minutes to obtain the polymerization mixture. Internal temperature was controlled to be 40° C. during polymerization. The polymerization mixture (polymerization solution) at the end of polymerization was in a homogeneous solution state.

Dry air aeration was stopped, and 10 kg of a 2.5 mass % aqueous solution of ethylenediaminetetraacetic acid tetrasodium salt (reagent manufactured by Dojindo Molecular Technologies, Inc.) was added to the polymerization mixture. The polymerization mixture was agitated at 70° C. for 150 minutes, then allowed to stand for 20 minutes, and the organic and aqueous phases were separated by liquid-liquid separation.

The fractionated organic phase yielded a toluene solution including 13.1 mass % polyphenylene ether. The solution was placed in a jacketed stirring tank and heated with a heating medium at 120° C. flowing through the jacket. Generated vapor, mainly toluene, was cooled by a condenser, the toluene was drained out of the system, and the polymer concentration in the stirred tank was concentrated to 30 mass %.

Next, the polymer was precipitated by mixing methanol at a ratio of 1.0 to the polymer solution. Wet polyphenylene ether was obtained by vacuum filtration using a glass filter. The wet polyphenylene ether was further washed with an amount of methanol that gave a ratio of 2.5 methanol to wet polyphenylene ether. The washing operation was performed three times. The wet polyphenylene ether was then kept at 140° C. and 1 mmHg for 120 minutes to obtain the polyphenylene ether in a dry state.

The obtained polyphenylene ether was subjected to each measurement by the methods described above. The measurement results are listed in Table 1.

Comparative Example 5

In a 40-liter jacketed polymerization tank equipped with a sparger for introducing oxygen-containing gas at the bottom of the tank, a stirring turbine impeller and baffle, and a reflux condenser at a vent gas line above the polymerization tank, 4.02 g of cupric oxide, 29.876 g of 47 mass % hydrogen bromide solution, 9.684 g of di-t-butylethylenediamine, 46.88 g of di-n-butylamine, 122.28 g of butyldimethylamine, 17.53 kg of toluene, and 1.5 kg of 2,6-dimethylphenol were added while blowing nitrogen gas at a flow rate of 0.5 L/min and stirring until a homogeneous solution was made and internal temperature of the polymerization tank reached 25° C. Next, dry air was introduced into the polymerization tank at a rate of 32.8 NL/minute through the sparger, and at the same time, a solution consisting of 1.62 kg of 2,6-dimethylphenol and 3.12 kg of toluene was added to the polymerization tank via a plunger pump over 30 minutes. Dry air was passed through for 86 minutes to obtain the polymerization mixture. Internal temperature was controlled to be 40° C. during polymerization. The polymerization mixture (polymerization solution) at the end of polymerization was in a homogeneous solution state. Other operations were performed in the same manner as in Comparative Example 1.

The results of each analysis are listed in Table 1.

Comparative Example 6

Aside from the phenol feedstock being 2 kg of 2,6-dimethylphenol, and air ventilation being stopped 117 minutes after the air was introduced, operations were carried out in the same manner as in Example 1.

The results of each analysis are listed in Table 1.

Comparative Example 7

In a 4.1 liter jacketed reactor equipped with a sparger for introducing oxygen-containing gas at the bottom of the reactor, a stirring turbine impeller and a baffle, and a reflux condenser at a vent gas line at the top of the reactor, 0.88 g of cupric chloride dihydrate, 3.76 g of 35% hydrochloric acid, 33.57 g of N,N,N',N'-tetramethylpropanediamine, 850 g of n-butanol, 1,982 g of methanol, and 630 g of 2,6-dimethylphenol were added. A composition weight ratio of the solvent used was n-butanol:methanol=30:70. Oxygen was then introduced into the reactor through the sparger at a rate of 410 mL/min while stirring vigorously, and at the same time, the polymerization temperature was adjusted through a heating medium in the jacket to maintain 40° C. The polymerization solution gradually took on the form of slurry.

After 200 minutes from the start of oxygen introduction, the oxygen-containing gas ventilation was stopped, and to the polymerization mixture was added a 50% aqueous solution in which 4.56 g of ethylenediaminetetraacetic acid tripotassium salt (reagent manufactured by Dojindo Molecular Technologies, Inc.) was dissolved, followed by a 20% methanol solution in which 8.52 g of hydroquinone (reagent manufactured by Wako Pure Chemical Industries, Ltd.) was added in small quantities. The resulting polymerization solution was transferred to a 4.1 liter jacketed reactor equipped with a stirring turbine impeller and a baffle and a reflux condenser at a vent gas line at the top of the reactor and reacted at 60° C. for 3 hours. After the reaction, the product was filtered and washed three times with a washing solution in which a mass ratio (b/a) of a methanol washing solution (b) to the polyphenylene ether (a) to be washed was 4, to obtain wet polyphenylene ether. The polyphenylene ether was then vacuum-dried at 120° C. for 4 hours to obtain dry polyphenylene ether. The analysis results of the obtained polyphenylene ether are listed in Table 1.

Comparative Example 8

Aside from the phenol feedstock being 2 kg of 2-tert-butyl-5-methylphenol, operations were carried out in the same manner as in Example 1.

The results of each analysis are listed in Table 1.

Production Example 1

In a 1.5 liter jacketed reactor equipped with a sparger for introducing oxygen-containing gas at the bottom of the reactor, a stirring turbine impeller and a baffle, and a reflux condenser at a vent gas line at the top of the reactor, a mixture of 0.092 g of preconditioned cuprous oxide and 0.69 g of 47% hydrogen bromide, 0.22 g of N,N'-di-t-butylethylenediamine, 3.27 g of dimethyl-n-butylamine, 1.07 g of di-n-butylamine, 714.65 g of toluene, 65.03 g of 2,6-dimethylphenol, and 14.97 g of 2,2-bis(3,5-dimethyl-4-hydroxyphenyl)propane were added. Next, air was started to be introduced into the reactor through the sparger at a rate of 0.84 L/min while stirring vigorously, and at the same time, the polymerization temperature was adjusted through a heating medium in the jacket to maintain 20° C. After 150 minutes from the start of air introduction, air ventilation was stopped and nitrogen gas was replaced in the reactor, and 0.99 g of ethylenediaminetetraacetic acid tetrasodium salt tetrahydrate (reagent manufactured by Dojindo Molecular Technologies, Inc.) was added to the polymerization mixture as a 160 g solution in water. The temperature was then increased to 70° C. and copper extraction was performed at 70° C. for 2 hours. An unmodified polyphenylene ether solution (organic phase) and an aqueous phase to which the catalyst metal was transferred were then separated by standing separation.

The resulting unmodified polyphenylene ether was used to obtain modified polyphenylene ether in the same manner as in Example 7.

The results of each analysis are listed in Table 2.

Comparative Example 10

A laminate was obtained in the same way as in Example 11, except that the polyphenylene ether described in Production Example 1 was used as the raw material.

The results of each analysis are listed in Table 3.

Reference Example 9

In a 1.5 liter jacketed reactor equipped with a sparger for introducing oxygen-containing gas at the bottom of the reactor, a stirring turbine impeller and a baffle, and a reflux condenser at a vent gas line at the top of the reactor, a mixture of 0.15 g of preconditioned cuprous oxide and 1.12 g of 47% hydrogen bromide, 0.36 g of N,N'-di-t-butylethylenediamine, 5.31 g of dimethyl-n-butylamine, 1.74 g of di-n-butylamine, 891.3 g of toluene, 50.0 g of 2,6-dimethylphenol, and 50.0 g of 2,5-dimethylphenol were added. Next, air was started to be introduced into the reactor through the sparger at a rate of 1.05 L/min while stirring vigorously, and at the same time, the polymerization temperature was adjusted through a heating medium in the jacket to maintain 40° C. After 120 minutes from the start of air introduction, the entire solution became highly viscous and a gel developed.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| Polymer composition | Ratio of 2,6-dimethylphenol added | mol % | 80 | 70 | 50 | 30 | 45 | 30 | 99 | 99 |
| | Ratio of 2-tert-butyl-5-methylphenol added | mol % | 20 | 30 | 50 | 70 | 50 | 50 | 1 | 1 |

TABLE 1-continued

| | | | | | | | | | | |
|---|---|---|---|---|---|---|---|---|---|---|
| | Ratio of 2-allylphenol added | mol % | 0 | 0 | 0 | 0 | 5 | 20 | 0 | 0 |
| Product analysis | Reduced viscosity | dL/g | 0.22 | 0.16 | 0.09 | 0.07 | 0.09 | 0.07 | 0.55 | 0.37 |
| | Molar ratio of 2-tert-butyl-5-methylphenol units to total moles of 2,6-dimethylphenol units and 2-tert-butyl-5-methylphenol units | mol % | 20 | 30 | 50 | 67 | 52 | 56 | 1 | 1 |
| | Molar ratio of 2-allylphenol units to total moles of 2,6-dimethylphenol units and 2-allylphenol units | mol % | 0 | 0 | 0 | 0 | 8 | 32 | 0 | 0 |
| | Average number of hydroxyl groups | Number/ Molecule | 1.5 | 1.8 | 2.0 | 2.3 | 1.7 | 1.7 | 1.1 | 1.1 |
| | Presence of moieties represented by Formulas (4), (5), (6), and (7) | — | None | None | None | None | None | None | None | None |
| | Molar ratio of impurity A | mol % | 0.5 | 0.5 | N.D. | N.D. | N.D. | N.D. | 1.0 | 1.0 |
| | Long-term solubility in methyl ethyl ketone (concentration 15 wt %, 20° C.) | — | ○ | ○ | ○ | ○ | ○ | ○ | x | x |
| | Long-term solubility in toluene (concentration 20 wt %, 20° C.) | — | ○ | ○ | ○ | ○ | ○ | ○ | ○ | ○ |

| | | | Comparative Example 3 | Comparative Example 4 | Comparative Example 5 | Comparative Example 6 | Comparative Example 7 | Comparative Example 8 |
|---|---|---|---|---|---|---|---|---|
| Polymer composition | Ratio of 2,6-dimethylphenol added | mol % | 90 | 100 | 100 | 100 | 100 | 0 |
| | Ratio of 2-tert-butyl-5-methylphenol added | mol % | 10 | 0 | 0 | 0 | 0 | 100 |
| | Ratio of 2-allylphenol added | mol % | 0 | 0 | 0 | 0 | 0 | 0 |
| Product analysis | Reduced viscosity | dL/g | 0.31 | 0.57 | 0.37 | 0.29 | 0.09 | Unreacted |
| | Molar ratio of 2-tert-butyl-5-methylphenol units to total moles of 2,6-dimethylphenol units and 2-tert-butyl-5-methylphenol units | mol % | 10 | 0 | 0 | 0 | 0 | — |
| | Molar ratio of 2-allylphenol units to total moles of 2,6-dimethylphenol units and 2-allylphenol units | mol % | 0 | 0 | 0 | 0 | 0 | — |
| | Average number of hydroxyl groups | Number/ Molecule | 1.5 | 1.1 | 1.1 | 1.0 | 1.1 | — |
| | Presence of moieties represented by Formulas (4), (5), (6), and (7) | — | None | None | None | None | None | — |
| | Molar ratio of impurity A | mol % | 0.7 | 1.2 | 1.2 | 1.0 | 0.5 | — |
| | Long-term solubility in methyl ethyl ketone (concentration 15 wt %, 20° C.) | — | x | x | x | x | Δ | — |
| | Long-term solubility in toluene (concentration 20 wt %, 20° C.) | — | ○ | x | x | x | ○ | — |

N.D. = below $^1$H NMR detection limit

TABLE 2

| | | | Example 7 | Example 8 | Example 9 | Example 10 | Production Example 1 |
|---|---|---|---|---|---|---|---|
| Polymer composition | Ratio of 2,6-dimethylphenol added | mol % | 50 | 50 | 50 | 45 | 2,6-Dimethyl-phenol:2,2-bis(3,5-dimethyl-4-hydroxy-phenyl)propane = 91:9 |
| | Ratio of 2-tert-butyl-5-methylphenol added | mol % | 50 | 50 | 50 | 50 | |
| | Ratio of 2-allylphenol added | mol % | 0 | 0 | 0 | 5 | |
| Product analysis | Reduced viscosity | dL/g | 0.09 | 0.09 | 0.09 | 0.09 | 0.09 |
| | Molar ratio of 2-tert-butyl-5-methylphenol units to total moles of 2,6-dimethylphenol units and 2-tert-butyl-5-methylphenol units | mol % | 50 | 50 | 50 | 52 | — |
| | Average number of hydroxyl groups | Number / Molecule | Less than 0.2 | Less than 0.2 | Less than 0.2 | Less than 0.2 | Less than 0.2 |
| | Presence of moiety represented by Formulas (4), (5), (6), and (7) | — | Yes (Formula 6) | Yes (Formula 7) | Yes (Formula 5) | Yes (Formula 6) | Yes (Formula 6) |
| | Molar ratio of impurity A | mol % | N.D. | N.D. | N.D. | N.D. | — |
| | Long-term solubility in methyl ethyl ketone (concentration 15 wt %, 20° C.) | — | ○ | ○ | ○ | ○ | ○ |
| | Long-term solubility in toluene (concentration 20 wt %, 20° C.) | — | ○ | ○ | ○ | ○ | ○ |

TABLE 3

| | | Example 11 | Example 12 | Comparative Example 10 |
|---|---|---|---|---|
| Feedstock | Type of PPE used | PPE of Example 7 | PPE of Example 10 | PPE of Production Example 1 |
| Analysis of cured thermo-setting composition | Dielectric loss tangent (@10 GHz) | 0.00287 | 0.00321 | 0.00399 |

As illustrated in Table 1 and Table 2, in comparison with the comparative examples, polyphenylene ethers of various reduced viscosities with improved solvent solubility in methyl ethyl ketone were obtained by using the polyphenylene ethers of the examples.

INDUSTRIAL APPLICABILITY

The polyphenylene ether of the present disclosure has excellent solvent solubility, making it industrially valuable for electronic material applications and modifier applications.

The invention claimed is:

1. A polyphenylene ether composition comprising:

a total of 100 mol % of a repeating unit derived from a phenol of Formula (1) below and a repeating unit derived from a phenol of Formula (2) below, wherein from 5 mol % to 85 mol % is the repeating unit derived from the phenol of Formula (1) and from 15 mol % to 95 mol % is the repeating unit derived from the phenol of Formula (2), and a reduced viscosity (ηsp/c) measured in chloroform solution at a concentration of 0.5 g/dL at 30° C. is from 0.03 dL/g to 0.30 dL/g, (Formula 1)

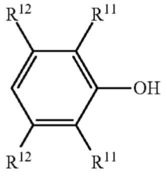

in Formula (1), $R^{11}$ are each independently a saturated hydrocarbon group having 1 to 6 carbons that may be substituted, an aryl group having 6 to 12 carbons that may be substituted, or a halogen atom, and $R^{12}$ are each independently a hydrogen atom, a carbon hydrocarbon group having 1 to 6 carbons that may be substituted, a carbon aryl group having 6 to 12 carbons that may be substituted, or a halogen atom, (Formula 2)

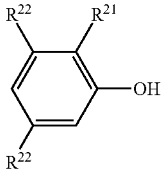

in Formula (2), $R^{22}$ are each independently a hydrogen atom, a saturated or unsaturated hydrocarbon group having 1 to 20 carbons that may be substituted, an aryl group having 6 to 12 carbons that may be substituted, or a halogen atom, where two $R^{22}$ are not both hydrogen atoms, and $R^{21}$ is a moiety structure represented by Formula (3) below, (Formula 3)

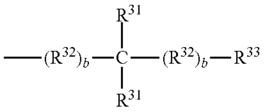

in Formula (3), $R^{31}$ are each independently a linear alkyl group having 1 to 8 carbons that may be substituted, or a cyclic alkyl structure having 1 to 8 carbons to which two $R^{31}$ are bonded, $R^{32}$ are each independently an alkylene group having 1 to 8 carbons that may be substituted, b are each independently 0 or 1, and $R^{33}$ is a hydrogen atom, an alkyl group having 1 to 8 carbons that may be substituted, or a phenyl group that may be substituted.

2. The polyphenylene ether of claim 1, wherein the moiety structure represented by Formula (3) is a t-butyl group.

3. The polyphenylene ether of claim 1, wherein an average number of hydroxyl groups is less than 2.5 per molecule.

4. The polyphenylene ether of claim 1, wherein an average number of hydroxyl groups is less than 0.2 per molecule.

5. The polyphenylene ether of claim 1, having at least one moiety structure selected from the group consisting of Formula (4), Formula (5), Formula (6), and Formula (7) below and having an average number of hydroxyl groups less than 0.2 per molecule, (Formula 4)

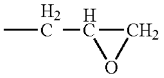

(Formula 5)

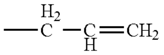

(Formula 6)

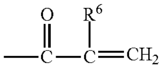

in Formula (6), $R^6$ is a hydrogen atom or a saturated or unsaturated hydrocarbon group having 1 to 10 carbons, where the saturated or unsaturated hydrocarbons may have substituents as long as the condition of 1 to 10 carbons is satisfied, (Formula 7)

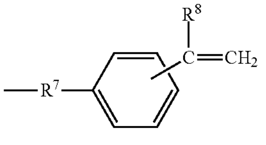

in Formula (7), $R^7$ is a saturated or unsaturated divalent hydrocarbon group having 1 to 10 carbons, and the saturated or unsaturated divalent hydrocarbons may have substituents as long as the condition of 1 to 10 carbons is satisfied, and $R^8$ is a hydrogen atom or a saturated or unsaturated hydrocarbon group having 1 to 10 carbons, and the saturated or unsaturated hydrocarbon may have substituents as long as the condition of 1 to 10 carbons is satisfied.

6. The polyphenylene ether of claim 1, comprising a repeating unit derived from a monohydric phenol having at least one unsaturated hydrocarbon group on a carbon atom ortho position to a carbon atom to which a hydroxyl group of phenol is bonded.

7. The polyphenylene ether of claim 6, wherein the monohydric phenol is 2-allylphenol or 2-methyl-6-allylphenol.

8. A method of producing the polyphenylene ether of claim 1, comprising a process of oxidative polymerization of a phenol of Formula (1) and a phenol of Formula (2).

9. A polyphenylene ether solution comprising the polyphenylene ether of claim 1 and a ketone solvent.

10. A thermosetting composition comprising the polyphenylene ether of claim 1.

11. A prepreg comprising a base material and the thermosetting composition of claim 10.

12. The prepreg of claim 11, wherein the base material is glass cloth.

13. A laminate comprising a cured product of the prepreg of claim 11 and a metal foil.

14. The polyphenylene ether of claim 1, wherein the reduced viscosity (ηsp/c) measured in chloroform solution at a concentration of 0.5 g/dL at 30° C. is from 0.03 dL/g to 0.22 dL/g.

15. The polyphenylene ether of claim 14, wherein the reduced viscosity (ηsp/c) measured in chloroform solution at a concentration of 0.5 g/dL at 30° C. is from 0.03 dL/g to 0.16 dL/g.

16. The polyphenylene ether of claim 14, wherein from 5 mol % to 80 mol % is the repeating unit derived from the phenol of Formula (1) and from 20 mol % to 95 mol % is the repeating unit derived from the phenol of Formula (2) with respect to a total of 100 mol % of the repeating unit derived from the phenol of Formula (1) and the repeating unit derived from the phenol of Formula (2).

17. The polyphenylene ether of claim 15, wherein from 5 mol % to 80 mol % is the repeating unit derived from the phenol of Formula (1) and from 20 mol % to 95 mol % is the repeating unit derived from the phenol of Formula (2) with respect to a total of 100 mol % of the repeating unit derived from the phenol of Formula (1) and the repeating unit derived from the phenol of Formula (2).

18. The polyphenylene ether of claim 15, wherein from 5 mol % to 70 mol % is the repeating unit derived from the phenol of Formula (1) and from 30 mol % to 95 mol % is the repeating unit derived from the phenol of Formula (2) with respect to a total of 100 mol % of the repeating unit derived from the phenol of Formula (1) and the repeating unit derived from the phenol of Formula (2).

19. The polyphenylene ether of claim 1, wherein from 5 mol % to 80 mol % is the repeating unit derived from the phenol of Formula (1) and from 20 mol % to 95 mol % is the repeating unit derived from the phenol of Formula (2) with respect to a total of 100 mol % of the repeating unit derived from the phenol of Formula (1) and the repeating unit derived from the phenol of Formula (2).

20. The polyphenylene ether of claim 19, wherein from 5 mol % to 70 mol % is the repeating unit derived from the phenol of Formula (1) and from 30 mol % to 95 mol % is the repeating unit derived from the phenol of Formula (2) with respect to a total of 100 mol % of the repeating unit derived from the phenol of Formula (1) and the repeating unit derived from the phenol of Formula (2).

21. The polyphenylene ether of claim 1, wherein from 5 mol % to 82 mol % is the repeating unit derived from the phenol of Formula (1) and from 18 mol % to 95 mol % is the repeating unit derived from the phenol of Formula (2) with respect to a total of 100 mol % of the repeating unit derived from the phenol of Formula (1) and the repeating unit derived from the phenol of Formula (2).

* * * * *